United States Patent
Iwase et al.

(10) Patent No.: US 10,717,223 B2
(45) Date of Patent: Jul. 21, 2020

(54) THERMOPLASTIC RESIN FILM AND PRODUCTION METHOD THEREOF, IN-MOLD MOLDING LABEL, AND PLASTIC CONTAINER WITH LABEL AND PRODUCTION METHOD THEREOF

(71) Applicant: YUPO CORPORATION, Tokyo (JP)

(72) Inventors: Yuichi Iwase, Ibaraki (JP); Shunsuke Honda, Ibaraki (JP); Takahiko Ueda, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 372 days.

(21) Appl. No.: 15/550,586

(22) PCT Filed: Feb. 12, 2016

(86) PCT No.: PCT/JP2016/054087
§ 371 (c)(1),
(2) Date: Aug. 11, 2017

(87) PCT Pub. No.: WO2016/133012
PCT Pub. Date: Aug. 25, 2016

(65) Prior Publication Data
US 2018/0036934 A1 Feb. 8, 2018

(30) Foreign Application Priority Data
Feb. 16, 2015 (JP) ................. 2015-028000

(51) Int. Cl.
*B29C 49/24* (2006.01)
*B65D 65/40* (2006.01)
(Continued)

(52) U.S. Cl.
CPC ................ *B29C 49/24* (2013.01); *B32B 7/12* (2013.01); *B32B 27/00* (2013.01); *B32B 27/08* (2013.01);
(Continued)

(58) Field of Classification Search
None
See application file for complete search history.

(56) References Cited

U.S. PATENT DOCUMENTS

2001/0028952 A1    10/2001  Nishizawa et al.
2005/0260427 A1*   11/2005  Kochem ........... B29C 45/14811
                                                         428/523
(Continued)

FOREIGN PATENT DOCUMENTS

CN    102110392      6/2011
CN    102576502 A    7/2012
(Continued)

OTHER PUBLICATIONS

Extended European Search Report issued in the corresponding European Patent Application No. 16752398.4 dated Sep. 5, 2018.
(Continued)

*Primary Examiner* — Edmund H Lee
(74) *Attorney, Agent, or Firm* — Greenblum & Bernstein, P.L.C.

(57) ABSTRACT

A thermoplastic resin film of the present invention contains at least a base layer containing a thermoplastic resin and a heat seal layer containing a thermoplastic resin; a melting point of the thermoplastic resin contained in the heat seal layer is lower than a melting point of the thermoplastic resin of the base layer; a core roughness depth Rk of a surface of the heat seal layer being from 1.2 to 9.0 μm; and a ratio Rzjis/Rk of a ten point height of roughness profile Rzjis to a core roughness depth Rk of the surface of the heat seal layer measured in accordance with JIS B0601:2013 Appendix 1 being from 2.0 to 9.0.

16 Claims, 2 Drawing Sheets

(51) Int. Cl.
  *G09F 3/04* (2006.01)
  *B32B 27/00* (2006.01)
  *C09J 7/29* (2018.01)
  *B32B 27/08* (2006.01)
  *B32B 27/18* (2006.01)
  *B32B 27/20* (2006.01)
  *B32B 27/32* (2006.01)
  *B32B 7/12* (2006.01)
  *B65D 25/36* (2006.01)
  *G09F 3/10* (2006.01)
  *B65D 1/00* (2006.01)

(52) U.S. Cl.
  CPC .............. *B32B 27/18* (2013.01); *B32B 27/20* (2013.01); *B32B 27/205* (2013.01); *B32B 27/32* (2013.01); *B65D 25/36* (2013.01); *B65D 65/40* (2013.01); *C09J 7/29* (2018.01); *G09F 3/04* (2013.01); *G09F 3/10* (2013.01); *B29K 2715/006* (2013.01); *B32B 2264/10* (2013.01); *B32B 2270/00* (2013.01); *B32B 2307/31* (2013.01); *B32B 2307/4023* (2013.01); *B32B 2307/514* (2013.01); *B32B 2307/516* (2013.01); *B32B 2307/538* (2013.01); *B32B 2519/00* (2013.01); *B65D 1/00* (2013.01)

(56) References Cited

U.S. PATENT DOCUMENTS

| | | | | |
|---|---|---|---|---|
| 2007/0003777 A1* | 1/2007 | Iwasa | ...................... | B32B 27/08 428/523 |
| 2016/0009018 A1* | 1/2016 | Funato | ...................... | C09J 7/22 428/327 |
| 2019/0055043 A1* | 2/2019 | Matsunaga | ............. | B29C 63/40 |

FOREIGN PATENT DOCUMENTS

| | | |
|---|---|---|
| CN | 203311748 U | 11/2013 |
| EP | 1055715 A1 | 11/2000 |
| EP | 122704 A1 | 8/2001 |
| EP | 2348084 A1 | 7/2011 |
| JP | 03-260689 A | 11/1991 |
| JP | 10-231150 A | 9/1998 |
| JP | 2002241514  * | 8/2002 |
| JP | 2012-155153 A | 8/2012 |
| TW | 491766 | 6/2002 |
| WO | 00/17839 A1 | 3/2000 |
| WO | 2006/106775 A1 | 10/2006 |
| WO | 2011/046126 A1 | 4/2011 |
| WO | 2013/161403 A1 | 10/2013 |
| WO | 2014/131372 A1 | 9/2014 |

OTHER PUBLICATIONS

Office Action dated May 6, 2019 issued in corresponding TW Patent App. No. 105104403 with English Translation.
Office Action dated May 3, 2019 issued in corresponding Australian patent application No. 2016220908.
Office Action dated Jun. 19, 2019 issued in the corresponding Chinese patent application No. 201680010397.X with English Machine Translation.
Chinese Office Action issued in corresponding Chinese Patent Application No. 201680010397.X dated Nov. 23, 2018 with English machine translation.
International Search Report from Patent Application No. PCT/JP2016/054087 dated Apr. 19, 2016.
International Preliminary Report on Patentability from Patent Application No. PCT/JP2016/054087 dated Aug. 31, 2017.
Written Opinion of the International Searching Authority from Patent Application No. PCT/JP2016/054087 dated Apr. 26, 2016.
First Examination Report issued in Indian patent app. No. 201717031393 (dated Dec. 4, 2019).

* cited by examiner

Fig. 1A
Fig. 1B
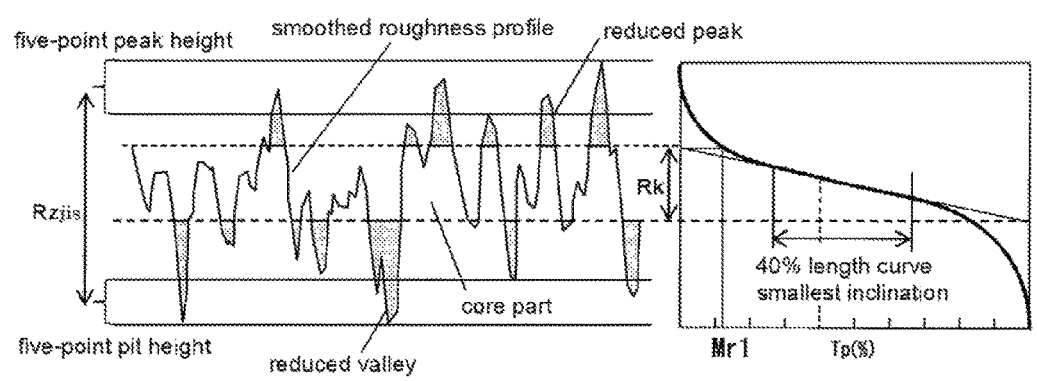
Fig. 2
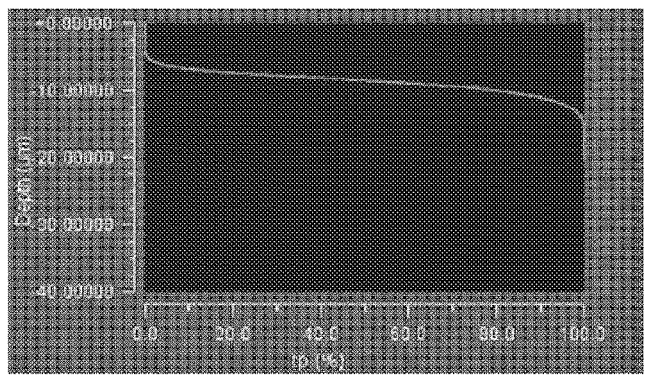
Fig. 3
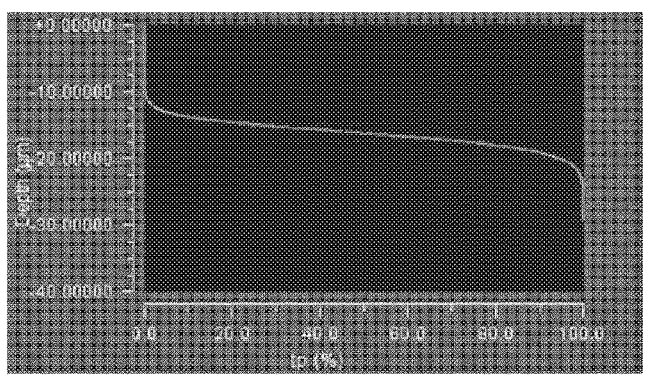

THERMOPLASTIC RESIN FILM AND PRODUCTION METHOD THEREOF, IN-MOLD MOLDING LABEL, AND PLASTIC CONTAINER WITH LABEL AND PRODUCTION METHOD THEREOF

TECHNICAL FIELD

The present invention relates to, for example, a thermoplastic resin film used in an in-mold molding label and a plastic container with a label using the same. The present invention particularly relates to a thermoplastic resin film by which information, such as characters, symbols, and images, is suitably printed on the front surface and by which adhesion with high adhesive strength to a molding resin provided for in-mold label process is made possible while generation of blisters are suppressed.

BACKGROUND ART

Various sizes and shapes of plastic containers have been used to contain various liquids (e.g. edible oils, liquid seasonings, beverages, alcohols, detergents for kitchen, detergents for clothes, shampoos, hair dressing agents, liquid soaps, rubbing alcohols, oils for automobiles, detergents for automobiles, agricultural chemicals, insecticides, and herbicides) to transport, to display, to purchase, to store, and to use the liquid. These plastic containers are typically produced by blow molding or the like as plastic containers having a single layer or a plurality of layers using a resin, such as polyethylene, polypropylene, polyester, or polyamide.

Furthermore, these plastic containers are provided with labels with trade names and other information to identify the contents thereof. In many cases, such a label is provided on a plastic container after the plastic container is formed, by providing a pressure-sensitive adhesive agent layer on a paper material or by using a heat-shrinkable film; however, the label can be provided on the container at the same time of the formation of the plastic container.

A method in which a label is placed in a mold, and the label is provided on a plastic container at the same time as the molding of the plastic container in the mold is typically referred to as an in-mold label process. Since the in-mold label process does not require adhering of the label after molding the container or storing the molded product in the middle of the process, it is advantageous in that labor saving, reduction in space required to store products in the middle of the process, and immediate shipping are made possible. As the label used in the in-mold label process (in-mold molding label), typically, a thermoplastic resin film having a laminate structure, in which a heat seal layer having thermal adhesiveness is formed on a base layer containing a thermoplastic resin as a main component, is used. In this thermoplastic resin film, the face located on the opposite side of the base layer of the heat seal layer (back surface) is used as a heat seal surface that is thermally adhered to a plastic container, and the face located on the opposite side of the heat seal layer of the base layer (front surface) is used as a printing surface on which information, such as characters and images, is printed.

In the in-mold label process, when it is difficult for air trapped in between resin and an in-mold label before molding to escape, the air may remain in between the label and the plastic container after the molding, thereby reducing the adhesive strength of the label and/or causing failure in appearance, which is a so-called blister.

Therefore, air flow paths are formed by making recessions and protrusions on a surface on the side to which the plastic container is adhered (heat seal surface) of the in-mold label.

For example, Patent Document 1 discloses an embossing pattern that does not cause blisters due to high adhesive strength of the label as a result of comparing and studying embossing patterns of forward gravure and reverse gravure as well as the dot shape and the number of lines of embossing.

Furthermore, Patent Document 2 discloses that a structure in which rows of protrusions are arranged in a particular pattern was obtained by a method including embossing in a laminating step of a heat seal layer as a result of comparing parameters of publicly known embossing patterns.

CITATION LIST

Patent Literature

Patent Document 1: JP-A-03-260689
Patent Document 2: JP-A-2012-155153

SUMMARY OF INVENTION

Technical Problem

However, in a conventional in-mold label in which an embossing pattern is formed on a heat seal surface, the embossing pattern of the heat seal surface may appear on the printed surface when printing is performed on the front surface. It was found that this is caused by the recession (transcription of the recessed and protruded shape) formed on the front surface by intensely pressing the embossing pattern of the heat seal surface of the thermoplastic resin film against the front surface of an adjacent thermoplastic resin film as a result of stacking thermoplastic resin films as the raw materials of the label during the production process of the in-mold label.

To solve such conventional technical problems, the inventors of the present invention conducted research to provide a thermoplastic resin film which has a plurality of recesses and protrusions that can form air flow paths in the heat seal surface and by which it becomes difficult for the recessed and protruded shape to be transferred onto the front surface of the heat seal surface when the thermoplastic resin film is stacked. The research was further conducted, by using such a thermoplastic resin film, to provide an in-mold molding label by which information, such as images and characters, is suitably printed on the front surface and by which adhesion with high adhesive strength to a molding resin provided for in-mold label process is made possible while generation of blisters are suppressed, and a plastic container with a label to which the in-mold molding label was adhered.

Solution to Problem

As a result of diligent research of the inventors of the present invention, it was found that, to suppress the transfer of the recessed and protruded shape of the heat seal surface to the front surface when the thermoplastic resin film is stacked while a plurality of recessions and protrusions that can form air flow paths are provided on the heat seal surface in the thermoplastic resin film, it is important to control the contact area between the heat seal surface and the front surface when the thermoplastic resin film is stacked. By specifying the core roughness depth Rk of the heat seal surface and the ratio Rzjis/Rk of the ten point height of roughness profile Rzjis to the core roughness depth Rk to particular ranges, the surface properties that can achieve both air discharging effect due to recesses and protrusions and suppression of transferring of the recessed and protruded shape in the heat seal surface are realized. This allows a thermoplastic resin film having excellent printability, adhesive strength, and appearance after the adhesion.

That is, the present invention has the following structure.

[1]
A thermoplastic resin film including at least a base layer containing a thermoplastic resin and a heat seal layer containing a thermoplastic resin; the heat seal layer containing the thermoplastic resin having a melting point lower than a melting point of the thermoplastic resin of the base layer; a core roughness depth Rk of a surface of the heat seal layer measured in accordance with ISO 13565-2:1996 being from 1.2 to 9.0 μm; and a ratio Rzjis/Rk of a ten point height of roughness profile Rzjis to a core roughness depth Rk of the surface of the heat seal layer measured in accordance with JIS B0601:2013 Appendix 1 being from 2.0 to 9.0.

[2]
The thermoplastic resin film according to [1], where a core material portion Mr1 of the surface of the heat seal layer measured in accordance with ISO 13565-2:1996 is from 3.7 to 15.0%.

[3]
The thermoplastic resin film according to [1], where an Oken smoothness of the surface of the heat seal layer measured in accordance with JIS P 8155:2010 is from 1000 to 10000 seconds.

[4]
The thermoplastic resin film according to any one of [1] to [3], further including an intermediate layer in between the base layer and the heat seal layer; the intermediate layer containing from 40 to 85 mass % of a thermoplastic resin and from 15 to 60 mass % of an inorganic fine powder; and a melting point of the thermoplastic resin contained in the intermediate layer being equal to or lower than the melting point of the thermoplastic resin contained in the base layer.

[5]
The thermoplastic resin film according to any one of [1] to [4], where the heat seal layer contains from 15 to 50 mass % of a fine filler.

[6]
The thermoplastic resin film according to [5], where the heat seal layer contains a fine filler having an aspect ratio of 1 to 1.5 and a fine filler having an aspect ratio of greater than 1.5 but 10 or less.

[7]
The thermoplastic resin film according to any one of [1] to [6], where the heat seal layer contains two or more types of thermoplastic resins; among contents (mass %) of these thermoplastic resins relative to the total mass of the thermoplastic resins, a component (A) having the largest content and a component (B) having the second largest content following the component (A) are incompatible each other, and a ratio of the content of the component (A) to the content of the component (B) (content of component (A)/content of component (B)) is from 80/20 to 20/80.

[8]
The thermoplastic resin film according to [7], where a melting point of the component (B) is higher than a melting point of the component (A), and a difference between the melting point of the component (B) and the melting point of the component (A) is from 20 to 110° C.

[9]
A method of producing a thermoplastic resin film producing the thermoplastic resin film described in [4], the method including:
a forming step of forming a resin composition for a base layer containing a thermoplastic resin and an inorganic fine powder into a film;
a first resin layer forming step of forming a first resin layer containing a thermoplastic resin and an inorganic fine powder on the film;
a second resin layer forming step of forming a second resin layer containing a thermoplastic resin on the first resin layer; and
a laminate stretching step of stretching the laminate containing the film, the first resin layer, and the second resin layer at least in a uniaxial direction;
a thermoplastic resin having a melting point equal to or lower than a melting point of the thermoplastic resin contained in the resin composition for a base layer being used as the thermoplastic resin contained in the first resin layer; and
a thermoplastic resin having a melting point lower than the melting point of the thermoplastic resin contained in the resin composition for a base layer being used as the thermoplastic resin contained in the second resin layer.

[10]
The method of producing the thermoplastic resin film according to [9], where a thermoplastic resin having a higher melting point than the melting point of the thermoplastic resin contained in the second resin layer is used as the thermoplastic resin contained in the first resin layer, and the laminate is stretched at a temperature higher than the melting point of the thermoplastic resin contained in the second resin layer and lower than the melting point of the thermoplastic resin contained in the first resin layer in the laminate stretching step.

[11]
A method of producing a thermoplastic resin film producing the thermoplastic resin film described in any one of [1] to [4], the method including:
a forming step of forming a resin composition for a base layer containing a thermoplastic resin and an inorganic fine powder into a film;
a stretching step of obtaining a stretched film by stretching the film at least in a uniaxial direction;
a resin layer forming step of forming a resin layer containing a thermoplastic resin on the stretched film; and
an embossing step of performing emboss processing onto a surface of the resin layer;
a thermoplastic resin having a melting point lower than a melting point of the thermoplastic resin contained in the resin composition for a base layer being used as the thermoplastic resin contained in the resin layer.

[12]
A method of producing a thermoplastic resin film producing the thermoplastic resin film described in [8], the method including:
a forming step of forming a resin composition for a base layer containing a thermoplastic resin into a film;
a resin layer forming step of forming a resin layer containing a thermoplastic resin on the film; and
a laminate stretching step of stretching the laminate containing the film and the resin layer at least in a uniaxial direction;
a mixture of thermoplastic resins containing a component (A) and a component (B) satisfying the following conditions (a) to (c) being used as the thermoplastic resin contained in the resin layer; and the laminate being stretched at a temperature higher than a melting point of the component (A) and lower than a melting point of the component (B) in the laminate stretching step:

(a) among contents (mass %) of the thermoplastic resins contained in the resin layer relative to the total solid content of the resin layer, a component (A) being a component having the largest content, and a component (B) being a component having the second largest content following the component (A), and a ratio of the content of the component (A) to the content of the component (B) (content of component (A)/content of component (B)) being from 80/20 to 20/80;

(b) the melting point of the component (A) being lower than a melting point of the thermoplastic resin contained in the resin composition for a base layer, and the component (A) and the component (B) being incompatible each other; and (c) the melting point of the component (B) being higher than the melting point of the component (A), and a difference between the melting point of the component (B) and the melting point of the component (A) being from 20 to 110° C.

[13]

An in-mold molding label having the thermoplastic resin film described in any one of [1] to [8].

[14]

The in-mold molding label according to [13], where a surface on the other side against a heat seal layer surface of the thermoplastic resin film has printed information.

[15]

A plastic container with a label having the in-mold molding label described in [13] or [14] and a plastic container to which the in-mold molding label is adhered.

[16]

A method of producing a plastic container with a label, the method including a step of adhering the in-mold molding label described in [13] or [14] to the plastic container at the same time as blow molding of the plastic container.

Advantageous Effects of Invention

According to the present invention, a thermoplastic resin film which has a plurality of recesses and protrusions that can form air flow paths in the heat seal surface and by which it becomes difficult for the recessed and protruded shape of the heat seal surface to be transferred onto the front surface when the thermoplastic resin film is stacked can be obtained. Since the in-mold molding label obtained by cutting this thermoplastic resin film suppresses transferring of the recessed and protruded shape to the front surface, information such as characters and images can be suitably printed on the front surface. Furthermore, since the in-mold molding label has a plurality of recesses and protrusions that can form air flow paths on the heat seal surface, adhesion to a molding resin provided for in-mold label processing with high adhesive strength is made possible while generation of blisters are suppressed. Therefore, with a plastic container with a label to which this in-mold molding label has been adhered, the label is less likely to peel off, and excellent appearance of the label part can be achieved.

BRIEF DESCRIPTION OF DRAWINGS

FIGS. 1A and 1B are drawing illustrating examples of a smoothed roughness profile and a material ratio curve to determine the core roughness depth Rk and the ten point height of roughness profile Rzjis.

FIG. 2 is a drawing showing a material ratio curve in Example 1 of the present invention.

FIG. 3 is a drawing showing another material ratio curve in Example 5 of the present invention.

DESCRIPTION OF EMBODIMENTS

Figure 4:
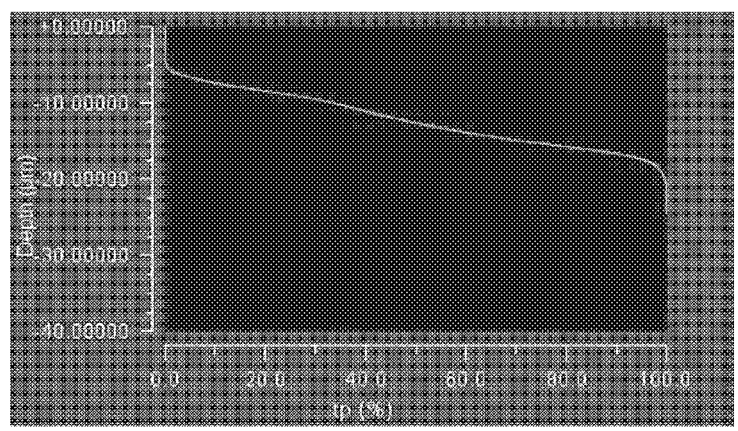
FIG. 4 is a drawing showing a material ratio curve in Comparative Example 1 of the present invention.

The present invention is described below using embodiments of the present invention; however, these embodiments described below do not limit the scope of the present invention. Furthermore, all the combinations of characteristics described in the embodiments are not necessarily essential to the resolution mean of the present invention. In the present specification, the numeric ranges expressed using "to" indicate ranges that include the numeric values written before and after the "to" as the lower and upper limit values, respectively. Furthermore, in the present specification, "main component" refers to the condition where a target substance contains the main component substance in an amount that is the greatest, in terms of mass.

Thermoplastic Resin Film

The thermoplastic resin film of the present invention contains at least a base layer containing a thermoplastic resin and a heat seal layer containing a thermoplastic resin. Note that the heat seal layer contains a thermoplastic resin having a melting point that is lower than the melting point of the thermoplastic resin of the base layer.

In the description below, in the thermoplastic resin film, the surface on the other side against a heat seal layer of the base layer may be referred to as "front surface" or "printing (printed) surface", and the surface on the other side against the base layer of the heat seal layer may be referred to as "back surface", "heat seal layer surface", or "heat seal surface".

Furthermore, in the present invention, "melting point" of thermoplastic resins contained in the base layer, the heat seal layer, and the intermediate layer which is described below refers to the melting peak temperature measured by differential scanning calorimetry (DSC) in accordance with JIS K7121:1987 "Testing Methods for Transition Temperatures of Plastics".

In the present invention, a core roughness depth Rk of the heat seal layer surface is from 1.2 to 9.0 μm, and the ratio Rzjis/Rk of the ten point height of roughness profile Rzjis to the core roughness depth Rk of the heat seal layer surface is from 2.0 to 9.0.

In the thermoplastic resin film having the Rk and the Rzjis/Rk of the heat seal layer surface within the ranges described above, during an in-mold label process, the recesses and protrusions of the heat seal layer surface form air flow paths, and air is efficiently discharged from the space in between the heat seal layer surface and the molding resin. As a result, the thermoplastic resin film and the molding resin can be adhered with high adhesive strength while generation of blisters are suppressed. Furthermore, when the thermoplastic resin film is stacked, transfer of the recessed and protruded shape of the heat seal layer surface onto the front surface is suppressed, and the recessed and protruded pattern is less likely to appear on the printed image that has been printed on the front surface. Because of this, printing information can be suitably provided on the thermoplastic resin film.

The Rk, the Rzjis/Rk, and other surface property parameters set in the present invention are described in detail below.

Surface Properties of Heat Seal Layer of Thermoplastic Resin Film

Regarding Core Roughness Depth Rk

The "core roughness depth Rk" in the present invention is a core roughness depth between the reduced peak height and the reduced valley depth of roughness profile specified in ISO 13565-2:1996 and JIS B0671-2:2002 "Geometrical Product Specifications (GPS)—Geometric features—Part 2: Extracted median line of a cylinder and a cone, extracted median surface, local size of an extracted feature".

The core roughness depth Rk is a surface property parameter determined using the smoothed roughness profile and the material ratio curve. The determination method of the core roughness depth Rk is described, referring to FIGS. 1A and 1B. FIG. 1A is an example of a smoothed roughness profile of the heat seal surface. FIG. 1B is a material ratio curve determined from the smoothed roughness profile of FIG. 1A. However, the smoothed roughness profile and the material ratio curve of the heat seal surface of the present invention are not limited to the patterns shown in FIGS. 1A and 1B.

To determine the core roughness depth Rk, the material ratio curve is determined from the smoothed roughness profile, and an equivalent straight line is drawn on the material ratio curve. Note that the horizontal axis of the material ratio curve indicates the proportion of the substantial portion among substantial portion and empty portion at a cut position when the smoothed roughness profile is cut in the horizontal direction at a particular height (proportion of cumulative length of the substantial portion relative to the sampling length (%):material portion), and the vertical axis indicates the height.

The equivalent straight line is a straight line that is a secant line of the material ratio curve when the difference in material portion ΔMr is 40% and that has the smallest inclination. The core part is the range in between two height positions where this straight line intersects with horizontal axes at the 0% material portion and at the 100% material portion, and the difference between these two height positions are the core roughness depth Rk. Typically, a larger value of Rk indicates a larger volume of major recess of the surface (recess of the core part). Furthermore, the part that is located higher than the position where the equivalent straight line intersects with the vertical axis at the position of the 0% material portion (the highest portion of the core part) is the reduced peak. The proportion of the area occupied by the reduced peak obtained from the measured face is represented by Mr1.

That is, it is conceived that, when the core roughness depth Rk of the heat seal surface becomes larger, the volume of the cavity that can form air flow paths becomes larger, and thus dischargeability of air from the space in between the thermoplastic resin film and the molding resin during the in-mold label process is enhanced. From this perspective, the core roughness depth Rk of the heat seal surface is set to 1.2 μm or greater in the present invention. The core roughness depth Rk is preferably 1.5 μm or greater, more preferably 2.5 μm or greater, and even more preferably 3.0 μm or greater. On the other hand, when the Rk is too large, the Mr1 decreases and thus the area of the reduced peak decreases relative to the measured area. Therefore, the contact area between the heat seal surface of the thermoplastic resin film and the resin before the molding is reduced, and the adhesive strength may decrease. Therefore, in the present invention, the core roughness depth Rk of the heat seal layer surface is set to 9.0 μm or less from the perspective of enhancing the adhesive strength of a label (thermoplastic resin film) in a plastic container with the label. The core roughness depth Rk is preferably 8.5 μm or less, and more preferably 8.0 μm or less.

Regarding Ten Point Height of Roughness Profile Rzjis and Rzjis/Rk

The "ten point height of roughness profile Rzjis" in the present invention is the ten point height of roughness profile specified in JIS B0601:2013 "Geometrical Product Specifications (GPS)—Surface texture: Profile method—Terms, definitions and surface texture parameters" Appendix 1. That is, only sampling length is extracted in the mean line direction from the roughness profile, then the sum of the absolute values of the peak heights (Yp) of the five highest peaks and the absolute values of the valley depth (Yv) of the five deepest valleys measured in the longitudinal magnification direction from the mean line of the extracted portion is determined, and then the determined value is divided by 5 and represented in terms of micrometer (μm). Typically, a larger value of the Rzjis indicates that a deeper recess (higher protrusion) exists on the surface. Therefore, since the depth of the cavity that can form air flow paths becomes larger when the ten point height of roughness profile Rzjis of the heat seal surface becomes larger, dischargeability of air from the space in between the thermoplastic resin film and the molding resin during the in-mold label process is expected to be enhanced. From this perspective, the ten point height of roughness profile Rzjis of the heat seal surface is preferably 9.0 μm or greater, and more preferably 15 μm or greater. On the other hand, when the ten point height of roughness profile Rzjis of the heat seal surface is too large, the contact area between the heat seal surface of the thermoplastic resin film and the resin before the molding is reduced, and the adhesive strength may decrease. Therefore, the average roughness Rzjis of the heat seal surface is preferably 30 μm or less, and more preferably 25 μm or less, from the perspective of enhancing the adhesive strength of a label (thermoplastic resin film) of a plastic container with the label.

However, even when the cavity is deep, it was found that sufficient air dischargeability cannot be exhibited if the width of the cavity is narrow. The indicator of the width of the cavity is the Rk described above. On the other hand, when the thermoplastic resin films are laid over and a load is applied thereto in a manner that the heat seal surface and the front surface are in contact each other, if the contact area between the projection portion of the heat seal surface and the front surface is small, it is conceived that the pressure applied to the contact portion is increased, and thus the shape of the projection portion (recessed and protruded shape) of the heat seal surface is readily transferred to the front surface. Therefore, to suppress the transfer of the recessed and protruded shape of the heat seal surface onto the front surface, an indicator to evaluate the contact area of the projection portion of the heat seal surface and the front surface is needed. An indicator is Rzjis/Rk and another indicator is Mr1.

Note that the Rzjis/Rk is a proportion of the height of the reduced peak relative to the height of the core part. When the height of the core part Rk is constant and the Rzjis/Rk is increased, the bottom area of the reduced peak is not changed, the height of the reduced peak is made high, and the reduced peak has a steep slope. Note that the area of the reduced peak corresponds to the Mr1 described below. That is, since it is preferred to narrow the bottom area of the reduced peak in order to increase the width of the cavity, a larger Rzjis/Rk tends to enhance the dischargeability of air from the space in between the heat seal surface and the resin. On the other hand, since the inclination of the reduced peak is preferably not steep to increase the contact area between the heat seal surface and the front surface, the recessed and protruded shape of the heat seal surface is less likely to be transferred to the front surface when the Rzjis/Rk is smaller. From these points, the Rzjis/Rk is 2.0 or greater, preferably 3.0 or greater, and more preferably 4.0 or greater, in the present invention. Furthermore, the Rzjis/Rk is 9.0 or less, preferably 8.0 or less, and more preferably 7.0 or less. As a result, the transfer of the recessed and protruded shape of the heat seal surface onto the front surface can be suppressed when a thermoplastic resin film is stacked, and air is efficiently discharged from the space in between the thermoplastic resin film and the molding resin during the in-mold label process, thereby making it possible to adhere the thermoplastic resin film to the molding resin with a high adhesive strength while generation of blisters are suppressed.

Regarding Material Portion Mr1 of Core Part

In the present specification, "material portion Mr1 of a core part" is a material portion of a core part specified in ISO 13565-2:1996. As shown in FIG. 1B, the material portion Mr1 of the core part refers to a material portion at the intersection of the boundary between the reduced peak and the core part and the material ratio curve. Furthermore, the Mr1 can be also referred to as the proportion of the area of the reduced peak in the measured area, as described above. Therefore, a smaller Mr1 is preferred to increase the volume of the cavity, and a larger Mr1 is preferred to increase the contact area of the heat seal surface and the front surface.

The material portion Mr1 of the core part of the heat seal surface is preferably 3.7% or greater, more preferably 5.0% or greater, and even more preferably 8.0% or greater. The material portion Mr1 of the core part of the heat seal surface is preferably 15.0% or less, more preferably 12.0% or less, and even more preferably 10.0% or less. As a result of setting the material portion Mr1 of the core part of the heat seal surface to be within the range described above, suppression of the transfer of the recessed and protruded shape onto the front surface is further ensured when a thermoplastic resin film is stacked, and air is efficiently discharged from the space in between the heat seal surface of the thermoplastic resin film and the molding resin during the in-mold label process.

Examples of the instrument that can measure the Rk specified in ISO 13565-2:1996 and the Rzjis specified in JIS B0601:2013 Appendix 1 include a non-contact surface profiler manufactured by Zygo Corporation, a high accuracy microfigure measuring instrument manufactured by Kosaka Laboratory Ltd., a laser scanning microscope manufactured by Keyence Corporation, a surface texture measuring instrument manufactured by Tokyo Seimitsu Co., Ltd., and the like. Examples described below can be referred to for the details of the measurement method.

Other Surface Properties

Smoothness

"Smoothness" in the present specification is an Oken smoothness specified in JIS P 8155:2010.

The smoothness of the heat seal surface is preferably 1000 seconds or greater, more preferably 2000 seconds or greater, and even more preferably 3000 seconds or greater. Furthermore, the smoothness of the heat seal surface is preferably 10000 seconds or less, more preferably 9000 seconds or less, and even more preferably 6000 seconds or less. As a result of setting the smoothness of the heat seal surface to be within the range described above, suppression of the transfer of the recessed and protruded shape onto the front surface is further ensured when a thermoplastic resin film is stacked, and air is efficiently discharged from the space in between the heat seal surface of the thermoplastic resin film and the molding resin during the in-mold label process.

Control of Surface Properties

Examples of the method of adjusting the Rk, Rzjis/Rk, and other surface property parameters of the heat seal surface to set ranges or preferable ranges of the present invention include (1) a method in which a fine filler is added to a heat seal layer and the particle size and the added amount thereof is controlled, (2) a method of forming embossment on the heat seal layer surface using an embossing roll, (3) a method in which an intermediate layer having microvoids in between the base layer and the heat seal layer is formed and a recess is formed on the heat seal surface by melting the thermoplastic resin of the heat seal layer down into the microvoids, (4) a method in which a combination of thermoplastic resins that are not compatible each other is blended as the thermoplastic resin of the heat seal layer to form recesses and protrusions on the surface of the heat seal layer, and the like. Two or more of these methods may be combined to control the surface properties.

The section of "Method of producing thermoplastic resin film" and "Examples" can be referred to for the details of these method.

Layer Structure and Production Method of Thermoplastic Resin Film

The thermoplastic resin film of the present invention contains at least a base layer containing a thermoplastic resin and a heat seal layer containing a thermoplastic resin, and may be composed of only the base layer and the heat seal layer or may contain other layer(s).

Examples of the specific layer structure include a type having an intermediate layer in between a base layer and a heat seal layer (Type A), a type having a base layer and a heat seal layer and the heat seal layer having been subjected to emboss processing with a particular shape or the like (Type B), and a type having a base layer and a heat seal layer and the heat seal layer having a particular composition (Type C).

Thermoplastic Resin Film of Type A

The thermoplastic resin film of Type A has a base layer, a heat seal layer, and an intermediate layer provided in between the base layer and the heat seal layer.

Intermediate Layer

The intermediate layer contains from 40 to 85 mass % of the thermoplastic resin and from 15 to 60 mass % of the fine filler. Note that the melting point of the thermoplastic resin contained in the intermediate layer is equal to or lower than the melting point of the thermoplastic resin contained in the base layer.

The thermoplastic resin of the intermediate layer may be selected from the thermoplastic resins that may be contained in the base layer described below, or may be selected from the thermoplastic resins that may be contained in the heat seal layer described below. However, the thermoplastic resin is selected in a manner that the melting point of the thermoplastic resin contained in the intermediate layer is lower than the melting point of the thermoplastic resin contained in the base layer. One type of these may be used alone, or two or more types of these may be mixed and used. Furthermore, from the perspective of making it difficult to cause delamination of the base layer and the intermediate layer and delamination of the heat seal layer and the intermediate layer during the in-mold label process and the use of the label, the thermoplastic resin of the intermediate layer preferably contains a thermoplastic resin having a high adhesion to both the thermoplastic resin selected for the base layer and the thermoplastic resin selected for the heat seal layer.

The melting point of the thermoplastic resin contained in the intermediate layer is preferably higher than the melting point of the thermoplastic resin contained in the heat seal layer, more preferably higher by at least 20° C., and even more preferably higher by at least 30° C. Furthermore, when the melting point of the thermoplastic resin contained in the intermediate layer is higher than the melting point of the thermoplastic resin contained in the heat seal layer, and the laminate stretching step described below is performed at a temperature that is higher than the melting point of the thermoplastic resin contained in the heat seal layer and that is lower than the melting point of the thermoplastic resin contained in the intermediate layer, formation of the recess on the back surface is facilitated by melting of the thermoplastic resin contained in the heat seal layer down into the microvoids formed in the intermediate layer.

In the intermediate layer, the content of the thermoplastic resin relative to the total solid content is preferably 40 mass % or greater from the perspective of enhancing air dischargeability from the space in between the heat seal surface of the thermoplastic resin film and the molding resin during the in-mold label process. On the other hand, from the perspective of increasing the contact area between the heat seal surface of the thermoplastic resin film and the resin before the molding, the content of the thermoplastic resin in the intermediate layer is preferably 85 mass % or less, more preferably 70 mass % or less, and even more preferably 60 mass % or less.

The intermediate layer contained in the thermoplastic resin film of Type A preferably contains a fine filler that becomes a core to form a microvoid. Because of this, by controlling the particle size and/or the content of the fine filler, the Rk, the Rzjis/Rk, and the other surface property parameters of the heat seal surface can be adjusted to appropriate ranges. Examples of the fine filler include inorganic fine powders and organic fillers.

As the inorganic fine powder, the type thereof is not particularly limited as long as the inorganic fine powder can make the intermediate layer porous. Specific examples of the inorganic fine powder include heavy calcium carbonate, light calcium carbonate, baked clay, talc, diatom earth, kaolin, barium sulfate, magnesium oxide, zinc oxide, titanium oxide, barium titanate, silica, alumina, zeolite, mica, sericite, bentonite, sepiolite, vermiculite, dolomite, wollastonite, glass fibers, and the like. Examples thereof also include substances obtained by subjecting these to surface treatment with a fatty acid, a high-molecular surfactant, an antistatic agent, and the like. Among these, heavy calcium carbonate, light calcium carbonate, baked clay, and talc are preferred from the perspectives of pore formability and low cost.

The organic filler is preferably an organic filler that is incompatible with the thermoplastic resin contained in the intermediate layer, that has the melting point or the glass transition temperature higher than that of the thermoplastic resin, and that is finely dispersed under the melt-kneading conditions of the thermoplastic resin. Specific examples of the resin constituting the organic filler include polyethylene terephthalate, polybutylene terephthalate, polyethylene naphthalate, polystyrene, polyamide, polycarbonate, nylon-6, nylon-6,6, cyclic polyolefin, polystyrene, polymethacrylate, polyethylene sulfide, polyphenylene sulfide, polyimide, polyether ketone, polyether ether ketone, polymethyl methacrylate, poly-4-methyl-1-pentene, homopolymers of cyclic olefin, copolymers of cyclic olefin and ethylene, and the like. Furthermore, these resins may be used after being crosslinked. Furthermore, fine powder of thermosetting resin such as melamine resin may be used.

As the inorganic fine powder and the organic filler, one type selected from these may be used alone, or a combination of two or more types of these may be used. When two or more types are combined, the combination may be a combination of an inorganic fine powder and an organic filler.

Among these, from the perspective of controlling the number and size of the microvoids without restriction, an inorganic fine powder is preferably selected.

The average particle size of the inorganic fine powder and the average dispersed particle size of the organic filler are each preferably 0.01 μm or greater, more preferably 0.1 μm or greater, and even more preferably 0.5 μm or greater, from the perspectives of ease in mixing with the thermoplastic resin and pore formability. On the other hand, from the perspective of increasing the contact area of the heat seal surface of the thermoplastic resin film and the resin before the molding in the in-mold label process, the average particle size of the inorganic fine powder and the average dispersed particle size of the organic filler are preferably 30 μm or less, more preferably 15 μm or less, and even more preferably 5 μm or less.

Note that "average particle size of an inorganic fine powder" refers to a particle size at 50% cumulative distribution (50% cumulative particle size) measured using a particle measurement device, such as laser diffraction particle size analyzer Microtrac (trade name; manufactured by Nikkiso Co., Ltd.). Furthermore, "average dispersed particle size of an organic filler" corresponds to a particle size of the organic filler dispersed in a thermoplastic resin due to melt-kneading and dispersion (average dispersed particle size) and refers to a particle size obtained by determining an average value by measuring maximum diameters of at least 10 particles by electron microscope observation of a cut surface of a thermoplastic resin film.

To the intermediate layer contained in the thermoplastic resin film of Type A, publicly known additives can be optionally added as necessary. Examples of the additive include antioxidants, light stabilizers, ultraviolet ray absorbents, dispersants of inorganic fine powder, lubricants such as higher fatty acid metal salts, antiblocking agents such as higher fatty acid amides, dyes, pigments, plasticizers, nucleating agents, releasing agents, flame retardants, and the like.

When an antioxidant is added, a sterically hindered phenol-based antioxidant, a phosphorus-based antioxidant, an amine-based antioxidant, or the like can be used in an amount typically in a range of 0.001 to 1 mass %. When a photostabilizer is used, a sterically hindered amine-based photostabilizer, a benzotriazole-based photostabilizer, or a benzophenone-based photostabilizer can be used in an amount typically in a range of 0.001 to 1 mass %. The dispersant and lubricant are used to disperse, for example, an inorganic fine powder. Specifically, a silane coupling agent, a higher fatty acid such as oleic acid and stearic acid, a metal soap, a poly(meth)acrylic acid, salts thereof, or the like can be used in an amount typically in a range of 0.01 to 4 mass %. These are preferably added in a range that does not impair the printability and the heat seal properties of the in-mold molding label formed from the thermoplastic resin film.

Base Layer

The base layer contained in the thermoplastic resin film of Type A serves as a support of the heat seal layer in the thermoplastic resin film and imparts mechanical strength, stiffness, and the like to the thermoplastic resin film. When the thermoplastic resin film is used as an in-mold molding label, this imparts resilience required during printing or inserting the label into a mold and also imparts water resistance, chemical resistance, printability as necessary, opacity, light weight, antistatic performance, and the like.

The base layer contained in the thermoplastic resin film of Type A contains a thermoplastic resin. Examples of the thermoplastic resin suitably used for the base layer include olefin-based resins described below; polyester-based resins; polyamide-based resins, such as nylon-6, nylon-6,6, nylon-6,10, and nylon-6,12; styrene-based resins, such as polycarbonate, atactic polystyrene, and syndiotactic polystyrene; and polyphenylenesulfide. One type of these may be used alone, or two or more types of these may be mixed and used.

Among these thermoplastic resins, it is preferable to use a polyolefin-based resin or a polyester-based resin, and it is more preferable to use a polyolefin-based resin.

Examples of the polyester-based resin include polyethylene terephthalate and copolymers thereof, polyethylene naphthalate, polybutylene terephthalate, aliphatic polyester, and the like.

Examples of the polyolefin-based resin include high density polyethylene, medium density polyethylene, low density polyethylene, propylene-based resin, poly-4-methyl-1-pentene, ethylene-cyclic olefin copolymers, and the like. Furthermore, examples thereof also include homopolymers of olefins, such as ethylene, propylene, butylene, hexene, octene, butadiene, isoprene, chloroprene, and methyl-1-pentene, and copolymers formed from two or more types of these olefins. Examples thereof also include ethylene-vinyl acetate copolymers, ethylene-(meth)acrylate copolymers, metal salts of ethylene-(meth)acrylate copolymers (ionomers), ethylene-alkyl acrylate copolymers, ethylene-alkyl methacrylate copolymers (number of carbons of the alkyl group is preferably from 1 to 8), functional group-containing polyolefin-based resins, such as maleic acid-modified polyethylene and maleic acid-modified polypropylene. Furthermore, even among these polyolefin-based resins, a propylene-based resin is preferably used from the perspectives of film formability, moisture barrier properties, mechanical strength, and cost. Examples of the propylene-based resin include isotactic or syndiotactic homopolypropylenes and homopolypropylenes having various stereoregularities which are obtained by subjecting propylene to homopolymerization. Examples thereof also include propylene-based copolymers having various stereoregularities obtained by subjecting propylene as a main component and α-olefin, such as ethylene, 1-butene, 1-hexene, 1-heptene, 1-octene, and 4-methyl-1-pentene, to copolymerization. The propylene-based copolymer may be a bipolymer, a terpolymer, or a multiple component polymer, and may be a random copolymer or a block copolymer. Furthermore, from the perspective of making it difficult to cause delamination of the base layer and the intermediate layer during the in-mold label process and the use of the label, the thermoplastic resin contained in the base layer preferably contains a thermoplastic resin having a high adhesion to the thermoplastic resin selected for the intermediate layer.

To the base layer contained in the thermoplastic resin film of Type A, an inorganic fine powder and an organic filler that are exemplified in the section of "Intermediate layer" described above, and publicly known additives can be optionally added as necessary.

In the base layer, the content of the thermoplastic resin relative to the total solid content is preferably 40 mass % or greater, more preferably 50 mass % or greater, and even more preferably 60 mass % or greater, from the perspective of enhancing the formability and/or the mechanical strength of the thermoplastic resin film. On the other hand, from the perspectives of imparting opacity and reducing weight of the thermoplastic resin film, the content of the thermoplastic resin in the base layer is preferably 90 mass % or less, more preferably 85 mass % or less, and even more preferably 80 mass % or less.

The base layer may have a layer that exhibits a different function and may have a multilayer structure. Examples of such a layer exhibiting a different function include a low density layer for whiteness, opacity, and weight reduction, a skin layer for suppressing the presence of foreign materials when extrusion forming from a die is performed or for increasing the adhesion to the intermediate layer, a printing applicable layer that has excellent printing ink fixing characteristics and that is provided on the front surface of the thermoplastic resin film, and the like.

Heat Seal Layer

The heat seal layer is a layer that contains a thermoplastic resin as a main component and that is provided on the surface on the other side against the base layer of the intermediate layer (surface of the back surface side). The heat seal layer functions as an adhesive agent that adheres the thermoplastic resin film and other resins.

The heat seal layer contains a thermoplastic resin that has a melting point that is lower than the melting point of the thermoplastic resin contained in the base layer. The melting point of the thermoplastic resin contained in the heat seal layer is preferably lower than the melting point of the thermoplastic resin contained in the base layer by at least 10° C., more preferably lower by at least 20° C., and even more preferably lower by at least 30° C. Furthermore, as described above, the melting point of the thermoplastic resin contained in the heat seal layer is preferably lower than the melting point of the thermoplastic resin contained in the intermediate layer.

Examples of the thermoplastic resin suitably used in the heat seal layer include resins such as high density polyethylenes, medium density polyethylenes, low density polyethylenes, straight-chain low density polyethylenes, ethylene-vinyl acetate copolymers, ethylene-(meth)acrylate copolymers, ethylene-alkyl (meth)acrylate copolymers (number of carbons of the alkyl group is preferably from 1 to 8), and metal salts of ethylene-(meth)acrylate copolymers (e.g. salts with a metal selected from Zn, Al, Li, K, and Na).

Examples of the thermoplastic resin also include random copolymers or block copolymers of α-olefin obtained by subjecting comonomers of at least two types selected from the group consisting of α-olefins having from 2 to 20 carbons in a molecule to copolymerization.

Examples of the α-olefin having from 2 to 20 carbons include ethylene, propylene, 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 4-methyl-1-hexene, 4,4-dimethyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, 1-heptene, methyl-1-hexene, ethyl-1-hexene, dimethyl-1-hexene, propyl-1-heptene, methylethyl-1-heptene, trimethyl-1-pentene, propyl-1-pentene, diethyl-1- butene, 1-nonene, 1-decene, 1-undecene, 1-dodecene, octadecene, and the like. Among these, from the perspectives of ease in performing copolymerization and economic efficiency, ethylene, propylene, 1-butene, 1-pentene, 1-hexene, and 1-octene are preferred.

Among these, an ethylene-based copolymer obtained by performing copolymerization using a low density polyethylene, straight-chain low density polyethylene, ethylene-vinyl acetate copolymer, and metallocene catalyst is preferred.

As the thermoplastic resin used in the heat seal layer, one type of these may be used alone, or a combination of two or more types of these may be used.

When the thermoplastic resin is a random copolymer of ethylene and α-olefin, for example, from the perspective of making shot cycle time of the in-mold molding shorter, use of an ethylene-α-olefin copolymer obtained by copolymerization using a metallocene catalyst is preferred.

As the catalyst during the ethylene-α-olefin copolymer synthesis, a metallocene catalyst, especially a metallocene-alumoxane catalyst or a catalyst formed from a metallocene compound, such as a metallocene compound disclosed in WO 92/01723, and a compound that forms a stable anion when being reacted with the metallocene compound is preferred.

In the heat seal layer, the content of the thermoplastic resin relative to the total solid content is preferably 50 mass % or greater, more preferably 65 mass % or greater, and even more preferably 80 mass % or greater, from the perspective of enhancing adhesion. Furthermore, in the heat seal layer, all of the total solid content may be the thermoplastic resin.

To the heat seal layer contained in the thermoplastic resin film of Type A, an antistatic agent may be blended in a range that does not affect the heat sealing performance from the perspectives of printing paper feeding/ejecting characteristics and handling.

Examples of the antistatic agent suitably blended to the heat seal layer include compounds having a primary to tertiary amine or a quaternary ammonium salt structure, and complete fatty acid esters or partial fatty acid esters of ethylene glycol, propylene glycol, glycerin, polyethylene glycol, and polyethylene oxide, and the like. Furthermore, a low molecular weight antistatic agent may be used from the perspective of kneading the antistatic agent into the heat seal layer for use and allowing the antistatic agent to transfer gradually to the surface to exhibit the antistatic effect. Furthermore, a high molecular weight antistatic agent may be used from the perspective of exhibiting the antistatic effect persistently at a low concentration. Furthermore, the low molecular weight antistatic agent and the high molecular weight antistatic agent may be used together.

The compounded proportion of the antistatic agent is preferably 0.01 mass % or greater, and more preferably 0.05 mass % or greater, relative to the total solid content of the heat seal layer from the perspective of exhibiting a predetermined performance of the antistatic agent. On the other hand, the compounded proportion of the antistatic agent is preferably 3 mass % or less, more preferably 2 mass % or less, and even more preferably 1 mass % or less, relative to the total solid content of the heat seal layer from the perspective of ensuring adhesive strength when the in-mold molding label is adhered to a plastic container.

Examples of the method of adding the antistatic agent include a method in which the antistatic agent is directly blended to the resin composition for the heat seal layer, and a method in which a master batch is obtained by blending the antistatic agent at a high concentration into a thermoplastic resin that is compatible with the thermoplastic resin used for the heat seal layer and then the master batch is blended into the resin composition for the heat seal layer.

An antiblocking agent may be blended to the heat seal layer contained in the thermoplastic resin film of Type A. Examples of the antiblocking agent that is suitably blended include polymer microparticles prepared by an emulsion polymerization method, a dispersion polymerization method, a suspension polymerization method, a seed polymerization method, or the like; inorganic microparticles of silica, alumina, synthetic zeolite, or the like; and fatty acid amide, such as N,N'-ethylenebisstearamide, N,N'-ethylenebisoleamide, erucamide, oleamide, stearamide, and behenamide. Among these, polymer microparticles and fatty acid amide which are less likely to damage the front surface of a thermoplastic resin film laid over the heat seal layer when the thermoplastic resin film is laid are preferred. As the antiblocking agent, one type of these may be used alone, or a combination of two or more types of these may be used.

The compounded proportion of the antiblocking agent is preferably 0.05 mass % or greater, and more preferably 0.5 mass % or greater, relative to the total solid content of the heat seal layer from the perspective of exhibiting a predetermined performance of the antiblocking agent. On the other hand, the compounded proportion of the antiblocking agent is preferably 30 mass % or less, more preferably 20 mass % or less, and even more preferably 10 mass % or less, relative to the total solid content of the heat seal layer from the perspective of ensuring adhesive strength when the in-mold molding label is adhered to a plastic container.

Examples of the method of adding the antiblocking agent include a method in which the antiblocking agent is directly blended to the resin composition for the heat seal layer, and a method in which a master batch is obtained by blending the antiblocking agent at a high concentration into a thermoplastic resin that is compatible with the thermoplastic resin used for the heat seal layer and then the master batch is blended into the resin composition for the heat seal layer.

Publicly known additives that are exemplified in the section of "Intermediate layer" described above can be optionally added to the heat seal layer contained in the thermoplastic resin film of Type A as necessary.

The compounded proportion of the additives is preferably 0.05 mass % or greater, and more preferably 0.5 mass % or greater, relative to the total solid content of the heat seal layer from the perspective of exhibiting a predetermined performance of the additives. On the other hand, the compounded proportion of the additives is preferably 7.5 mass % or less, more preferably 5 mass % or less, and even more preferably 3 mass % or less, relative to the total solid content of the heat seal layer from the perspective of ensuring adhesive strength when the in-mold molding label formed from this thermoplastic resin film is adhered to a plastic container.

Method of Producing Thermoplastic Resin Film of Type A

The thermoplastic resin film of Type A can be produced by using a forming step of obtaining a film by forming a resin composition for a base layer containing a thermoplastic resin and an inorganic fine powder into a film; a first resin layer forming step of forming a first resin layer containing a thermoplastic resin and an inorganic fine powder on the film; a second resin layer forming step of forming a second resin layer containing a thermoplastic resin on the first resin layer; and a laminate stretching step of stretching the laminate containing the film, the first resin layer, and the second resin layer at least in a uniaxial direction. Note that the melting point of the thermoplastic resin contained in the first resin layer is equal to or lower than the melting point of the thermoplastic resin contained in the resin composition for the base layer, and the melting point of the thermoplastic resin contained in the second resin layer is a temperature lower than the melting point of the thermoplastic resin contained in the resin composition for the base layer. Furthermore, in the thermoplastic resin film obtained in this production method, the layer originating from the film obtained by molding the resin composition for the base layer corresponds to "base layer", the layer originating from the first resin layer corresponds to "intermediate layer", and the layer originating from the second resin layer corresponds to the "heat seal layer".

For the explanations of the raw materials used in the film, the raw materials used in the first resin layer, and the raw materials used in the second resin layer, descriptions of the raw materials of the base layer, the raw materials of the intermediate layer, and the raw materials of the heat seal layer described above can be referred to, respectively. Note that, in this production method of the thermoplastic resin film, raw materials are selected in a manner that the melting point of the thermoplastic resin contained in the first resin layer (intermediate layer) is higher than the melting point of the thermoplastic resin contained in the second resin layer (heat seal layer) and the laminate stretching step is performed at a temperature that is higher than the melting point of the thermoplastic resin contained in the heat seal layer and that is lower than the melting point of the thermoplastic resin contained in the intermediate layer, to form a plurality of recesses on the back surface by forming microvoids in the intermediate layer and melting the thermoplastic resin contained in the heat seal layer down into the microvoids. As a result, the Rk and the Rzjis/Rk of the heat seal layer surface can be easily adjusted to the ranges set in the present invention.

A forming method, a laminating method, and a stretching method of the film used in each step are not particularly limited and various publicly known component technologies may be used alone or in a combination.

As the film forming technique, for example, cast forming in which a resin composition in the molten state is extruded into a sheet shape by a monolayer or multilayer T-die, T-die, or the like connected to a screw extruder, calender forming, roller forming, inflation forming, or the like can be used.

The film formed at this time may have a monolayer structure, a two-layer structure, a multilayer structure having three or more-layer structure. For example, it becomes possible to enhance mechanical properties and to impart various functions, such as writability, friction resistance, and secondary workability, by allowing the base layer to be multilayer.

Examples of the lamination technique of films include a dry lamination method and a wet lamination method in which various adhesive agents are used, a melt lamination method, a multilayer die method using a feed block and a multi-manifold (co-extrusion method), extrusion lamination method using a plurality of dies, a coating method using various coaters, and the like. A combination of a multilayer die and extrusion lamination may also be used.

As the stretching technique, a machine-direction stretching method between rolls utilizing the difference in peripheral speeds of a group of rolls, a transverse-direction stretching method utilizing a tenter oven, a sequential biaxial stretching method combining these, and the like can be used. Furthermore, a roll method by applying pressure by a roll, a simultaneous biaxial stretching method which is a combination of a tenter oven and a pantograph, a simultaneous biaxial stretching method combining a tenter oven and a linear motor, and the like can be used. Furthermore, a simultaneous biaxial stretching (inflation forming) method in which a molten resin is extruded into a tube shape using a circular die connected to a screw extruder and then air is inflated thereto, or the like can be used.

The thermoplastic resin film of Type A is stretched at least in a uniaxial direction after the intermediate layer (first resin layer) and the heat seal layer (second resin layer) are laminated. The number of axes of the stretching of base layer/intermediate layer/heat seal layer may be biaxial/uniaxial/uniaxial, uniaxial/biaxial/biaxial, biaxial/biaxial/uniaxial, or biaxial/biaxial/biaxial. Furthermore, before laminating each layer, each layer may be stretched, or stretching may be performed at once after the lamination. Furthermore, after the stretched layers are laminated, stretching may be performed again.

Among these, a method in which a film is formed by laminating the base layer/intermediate layer/heat seal layer in a multilayer die and then stretched in a uniaxial or biaxial direction, a method in which an intermediate layer and a heat seal layer are laminated simultaneously or successively onto a monolayer or multilayer unstretched film to be the base layer and then subjected to uniaxial or biaxial stretching, or a method in which an intermediate layer and a heat seal layer are laminated simultaneously or successively onto a monolayer or multilayer uniaxially stretched film to be the base layer and then subjected to uniaxial or biaxial stretching is preferred.

The stretching temperature of the thermoplastic resin film of Type A is preferably a temperature that is equal to or higher than the glass transition point of the thermoplastic resin in the case where the thermoplastic resin used in the intermediate layer is an amorphous resin from the perspective of forming microvoids in the intermediate layer. Furthermore, in the case where the thermoplastic resin used in the intermediate layer is a crystalline resin, the stretching temperature is preferably equal to or higher than the glass transition point of the amorphous part of the thermoplastic resin and is preferably lower than the melting point of the crystal part. On the other hand, from the perspective of melting the thermoplastic resin contained in the heat seal layer down in the microvoids, the stretching temperature is preferably higher than the melting point of the crystal part of the thermoplastic resin used in the heat seal layer. For example, when the thermoplastic resin used in the intermediate layer is a homopolymer of propylene (glass transition point: approximately −20° C.; melting point: 155 to 167° C.) and the thermoplastic resin used in the heat seal layer is a high density polyethylene (melting point: 121 to 136° C.), the stretching temperature is preferably 123 to 165° C.

The stretching speed in the case where the thermoplastic resin film of Type A is stretched is not particularly limited; however, from the perspective of stable stretching and forming of the thermoplastic resin film, the stretching speed is preferably in a range of 20 to 350 m/min. The stretching ratio is appropriately selected while the stretching characteristics of the thermoplastic resin used in the thermoplastic resin film is taken into consideration. For example, when the thermoplastic resin used in the thermoplastic resin film is a homopolymer of propylene or a copolymer thereof, in the case where the thermoplastic resin film is stretched in one direction, the stretching ratio is preferably approximately from 1.5 to 12 times, and more preferably from 2 to 10 times. Furthermore, in the case of biaxial stretching, the stretching ratio is preferably from 1.5 to 60 times, and more preferably from 4 to 50 times, in terms of the area stretching ratio.

In the production method of the thermoplastic resin film of Type A, a step of performing emboss processing on the heat seal layer surface may be performed to control the surface properties of the heat seal surface. The description for emboss processing used in the "Method of producing thermoplastic resin film of Type B" can be referred to for the description of the emboss processing.

Thermoplastic Resin Film of Type B

A thermoplastic resin film of Type B contains at least a base layer containing a thermoplastic resin and a heat seal layer containing a thermoplastic resin, and has a core roughness depth Rk of the heat seal layer surface and a ratio Rzjis/Rk of the ten point height of roughness profile Rzjis to the core roughness depth Rk that have been adjusted to the ranges set in the present invention by performing emboss processing on the heat seal layer surface.

Base Layer

The base layer contained in the thermoplastic resin film of Type B serves as a support of the heat seal layer in the thermoplastic resin film and imparts mechanical strength, stiffness, and the like to the thermoplastic resin film. When the thermoplastic resin film is used as an in-mold molding label, this imparts resilience required during printing or inserting the label into a mold and also imparts water resistance, chemical resistance, printability as necessary, opacity, light weight, antistatic performance, and the like.

The base layer contains a thermoplastic resin. A suitable resin for the thermoplastic resin is not particularly limited; however, the types of the thermoplastic resin that are exemplified in the section of "Thermoplastic resin of Type A" can be used. Among these thermoplastic resins, it is preferable to use a polyolefin-based resin or a polyester-based resin, and it is more preferable to use a polyolefin-based resin. One type of these may be used alone, or two or more types of these may be mixed and used.

The content of the thermoplastic resin in the base layer, relative to the total solid content of the base layer, is preferably 30 mass % or greater, more preferably 45 mass % or greater, and even more preferably 60 mass % or greater, from the perspective of film formability. Furthermore, the upper limit thereof may be 100 mass %. The thermoplastic resin film of Type B can be suitably used as a transparent thermoplastic resin film by setting the content of the thermoplastic resin in the base layer relatively high. From the perspectives of imparting whiteness and opacity and reducing weight of the thermoplastic resin film, the content of the thermoplastic resin in the base layer is preferably 90 mass % or less, more preferably 85 mass % or less, and even more preferably 80 mass % or less.

The base layer may also contain a fine filler, such as an inorganic fine powder and an organic filler.

Examples of the fine filler include types of fine fillers described in the section of "Intermediate layer" contained in the thermoplastic resin film of Type A. From the perspectives of excellent void formability and low cost, among these, heavy calcium carbonate, light calcium carbonate, baked clay, and talc are preferred. Furthermore, from the perspectives of whitening and opacification of the in-mold molding label, titanium oxide is preferred.

The explanations for the average particle size of the inorganic fine powder and the average dispersed particle size of the organic filler are the same as the descriptions of those in the section of "Intermediate layer" contained in the thermoplastic resin film of Type A.

The base layer may have a layer that exhibits a different function and may have a multilayer structure. Examples of such a layer exhibiting a different function include a low density layer for whiteness, opacity, and weight reduction, a skin layer for suppressing the presence of foreign materials when extrusion forming from a die is performed or for increasing the adhesion to the intermediate layer, a printing applicable layer that has excellent printing ink fixing characteristics and that is provided on the front surface of the thermoplastic resin film, and the like.

Heat Seal Layer

The heat seal layer is a layer that contains a thermoplastic resin as a main component and that is provided on the surface on one surface the base layer (surface of the back surface side). The heat seal layer functions as an adhesive agent that adheres the thermoplastic resin film and other resin. The thermoplastic resin contained in the heat seal layer has a melting point that is lower than the melting point of the thermoplastic resin contained in the base layer. The melting point of the thermoplastic resin contained in the heat seal layer is preferably lower than the melting point of the thermoplastic resin contained in the base layer by at least 10° C., more preferably lower by at least 20° C., and even more preferably lower by at least 30° C.

The descriptions in the section of "Heat seal layer" contained in the thermoplastic resin film of Type A can be referred to for the thermoplastic resin that is suitably used for the heat seal layer.

Among these, an ethylene-based copolymer obtained by performing copolymerization using a low density polyethylene, straight-chain low density polyethylene, ethylene-vinyl acetate copolymer, and metallocene catalyst is preferred.

As the thermoplastic resin used in the heat seal layer, one type of these may be used alone, or a combination of two or more types of these may be used.

In the heat seal layer, the content of the thermoplastic resin relative to the total solid content is preferably 50 mass % or greater, more preferably 65 mass % or greater, and even more preferably 80 mass % or greater, from the perspective of enhancing adhesion. Furthermore, in the heat seal layer, all of the total solid content may be the thermoplastic resin.

To the heat seal layer contained in the thermoplastic resin film of Type B, an antistatic agent may be blended in a range that does not affect the heat sealing performance from the perspectives of printing paper feeding/ejecting characteristics and handling. The descriptions in the section of "Heat seal layer" contained in the thermoplastic resin film of Type A can be referred to for the type, compounded proportion, and compounding method of the antistatic agent suitable for blending into the heat seal layer.

An antiblocking agent may be blended to the heat seal layer contained in the thermoplastic resin film of Type B. The descriptions in the section of "Heat seal layer" contained in the thermoplastic resin film of Type A can be referred to for the type, compounded proportion, and compounding method of the antiblocking agent suitable for blending into the heat seal layer.

Various publicly known additives may be blended to the heat seal layer contained in the thermoplastic resin film of Type B. The descriptions in the section of "Heat seal layer" contained in the thermoplastic resin film of Type A can be referred to for the type, compounded proportion, and compounding method of the additive suitable for blending into the heat seal layer.

Method of Producing Thermoplastic Resin Film of Type B

The thermoplastic resin film of Type B can be produced by using a forming step of obtaining a film by forming a resin composition for a base layer containing a thermoplastic resin and an inorganic fine powder into a film; a resin layer forming step of forming a resin layer containing a thermoplastic resin on the film; a stretching step of stretching the film at least in a uniaxial direction as necessary to obtain a stretched film; and an embossing step of subjecting a surface of the resin layer to emboss processing. The "stretching step" may be performed in between the "forming step of obtaining a film" and the "resin layer forming step", may be performed in between the "resin layer forming step" and the "embossing step", and may be performed after the "embossing step".

Note that the melting point of the thermoplastic resin contained in the resin layer is a temperature lower than the melting point of the thermoplastic resin contained in the resin composition for the base layer. Furthermore, in the thermoplastic resin film obtained in this production method, the layer originating from the film obtained by molding the resin composition for the base layer corresponds to "base layer" and the layer originating from the resin layer corresponds to the "heat seal layer".

For the explanations of the raw materials used in the film and the raw materials used in the resin layer, descriptions of the raw materials of the base layer and the raw materials of the heat seal layer described above can be referred to, respectively.

In conventional technologies, the ten point height of roughness profile (Rzjis) specified in JIS B0601:2013 Appendix 1 of the back surface is preferably from 3 to 30 μm. However, when a thermoplastic resin film having the Rzjis within this range is used in in-mold molding, dischargeability of air from the space in between the thermoplastic resin film and the molding resin is insufficient, and blisters are generated. In the present invention, an emboss processing method that adjusts the Rk and the Rzjis/Rk to the particular ranges is employed.

The film to be the base layer is obtained by forming a thermoplastic resin or a thermoplastic resin composition into a desired film. The base layer may be a film formed by optionally blending the fine filler, publicly known additives, and the like to the thermoplastic resin as described above.

As the method of forming a film to be the base layer, various publicly known component technologies may be used alone or in a combination, and the forming method is not particularly limited.

As the film forming technique, for example, cast forming in which a resin composition in the molten state is extruded into a sheet shape by a monolayer or multilayer T-die, I-die, or the like connected to a screw extruder, calender forming, roller forming, inflation forming, or the like can be used.

The film formed at this time may have a monolayer structure, a two-layer structure, a multilayer structure having three or more-layer structure. For example, it becomes possible to enhance mechanical properties and to impart various functions, such as writability, friction resistance, and secondary workability, by allowing the base layer to be multilayer.

Examples of the lamination technique of a film (resin layer) include a dry lamination method and a wet lamination method in which various adhesive agents are used, a melt lamination method, and a multilayer die method using a feed block and a multi-manifold (co-extrusion method), extrusion lamination method using a plurality of dies, a coating method using various coaters, and the like. A combination of a multilayer die and extrusion lamination may also be used.

As the stretching technique, a machine-direction stretching method between rolls utilizing the difference in peripheral speeds of a group of rolls, a transverse-direction stretching method utilizing a tenter oven, a sequential biaxial stretching method combining these, and the like can be used. Furthermore, a roll method by applying pressure by a roll, a simultaneous biaxial stretching method which is a combination of a tenter oven and a pantograph, a simultaneous biaxial stretching method combining a tenter oven and a linear motor, and the like can be used. Furthermore, a simultaneous biaxial stretching (inflation forming) method in which a molten resin is extruded into a tube shape using a circular die connected to a screw extruder and then air is inflated thereto, or the like can be used.

When the film to be the base layer is composed of a plurality of layers, from the perspective of high mechanical strength and excellent uniformity of thickness, at least one of the layers is preferably stretched at least in a uniaxial direction. The number of axes of the stretching of layers of the film to be the base layer is selected from uniaxial/uniaxial, uniaxial/biaxial, biaxial/uniaxial, uniaxial/uniaxial/biaxial, uniaxial/biaxial/uniaxial, biaxial/uniaxial/uniaxial, uniaxial/biaxial/biaxial, biaxial/biaxial/uniaxial, biaxial/biaxial/biaxial, and the like. In the case where the plurality of layers is stretched, before laminating each layer, each layer may be stretched, or stretching may be performed at once after the lamination. Furthermore, after the stretched layers are laminated, stretching may be performed again.

The stretching temperature, stretching speed, and stretching ratio are not particularly limited as long as the stretching is performed under suitable conditions for the thermoplastic resin contained in the film to be the base layer. For example, when the thermoplastic resin is a homopolymer of propylene (melting point: 155 to 167° C.), the stretching temperature is preferably from 100 to 166° C., and when the thermoplastic resin is a high density polyethylene (melting point: 121 to 136° C.), the stretching temperature is preferably from 70 to 135° C. The stretching speed is preferably in the range of 20 to 350 m/min. For example, when the thermoplastic resin is a homopolymer of propylene or a copolymer thereof, in the case where the film is stretched in one direction, the stretching ratio is preferably approximately from 1.5 to 12 times. In the case where the film is biaxially stretched, the stretching ratio is preferably from 1.5 to 60 times in terms of the area stretching ratio.

When the thermoplastic resin film of Type B is produced, examples of a method of emboss processing a surface (heat seal surface) of the resin layer to be the heat seal layer include a method in which the resin layer surface is formed by using a cooling roll provided with an embossing pattern at the same time as the lamination of the resin layer on the stretched film, and a method in which emboss is formed by lamination forming a resin layer on the stretched film and then heating the resin layer surface again.

As the embossing pattern of the cooling roll, from the perspective of air dischargeability from the back surface, the line density per 2.54 cm (1 inch) is preferably 20 lines or greater, more preferably 30 lines or greater, and even more preferably 50 lines or greater. Furthermore, since the embossing pattern is less likely to appear on the printed surface, the line density is preferably 1500 lines or less, more preferably 1200 lines or less, and even more preferably 1000 lines or less. Furthermore, from the perspective of efficiently discharging air from the space in between the heat seal surface of the thermoplastic resin film and the molding resin in the in-mold label process, the depth of the embossment is preferably 5 µm or greater, more preferably 10 µm or greater, and even more preferably 15 µm or greater. On the other hand, from the perspective of ensuring the contact area of the heat seal surface of the thermoplastic resin film and the resin before the molding, the depth of the embossment is preferably 50 µm or less, more preferably 30 µm or less, and even more preferably 25 µm or less.

Furthermore, after the embossing is performed on the resin layer to be the heat seal layer, heat stretching may be performed. However, to easily adjust the Rk and the Rzjis/Rk of the heat seal layer to the ranges described above, compared to the case where no heat stretching is performed after the embossing, a large number of lines within the range described above is preferably selected for the embossing roll and a deep depth within the range described above is preferably selected for the embossing. Furthermore, when the Rk is constant, although concave embossing may be performed on the heat seal layer, convex embossing is preferably performed on the heat seal layer from the perspective of making the Rzjis/Rk relatively high and easily adjusting the Rzjis/Rk to the range described above.

Thermoplastic Resin Film of Type C

A thermoplastic resin film of Type C contains at least a base layer containing a thermoplastic resin and a heat seal layer containing a thermoplastic resin, and has a core roughness depth Rk of the heat seal layer surface and a ratio Rzjis/Rk of the ten point height of roughness profile Rzjis to the core roughness depth Rk that have been adjusted to the ranges set in the present invention by using a particular composition for the heat seal layer. Note that the preferable ranges and specific examples of the base layer containing a thermoplastic resin and of components constituting the base layer are the same as those for the base layer in "Thermoplastic resin film of Type B", and the corresponding descriptions can be referred to. Similarly to the thermoplastic resin film of Type B, the thermoplastic resin film of Type C can be also suitably used as a transparent thermoplastic resin film by setting the content of the thermoplastic resin in the base layer relatively high.

Heat Seal Layer

The heat seal layer is a layer that contains a thermoplastic resin as a main component and that is provided on one surface of the base layer (surface of the back surface side). The heat seal layer functions as an adhesive agent that adheres the thermoplastic resin film and other resin. The thermoplastic resin contained in the heat seal layer has a melting point that is lower than the melting point of the thermoplastic resin contained in the base layer. The melting point of the thermoplastic resin contained in the heat seal layer is preferably lower than the melting point of the thermoplastic resin contained in the base layer by at least 10° C., more preferably lower by at least 20° C., and even more preferably lower by at least 30° C.

In the thermoplastic resin film of Type C, examples of the heat seal layer include (i) a heat seal layer containing a thermoplastic resin and a fine filler, and (ii) a heat seal layer containing at least two types of thermoplastic resins that are incompatible each other. These heat seal layers are described below.

(i) Heat Seal Layer Containing Thermoplastic Resin and Fine Filler

The descriptions in the section of "Heat seal layer" contained in the thermoplastic resin film of Type A can be referred to for the thermoplastic resin that is suitably used for this heat seal layer.

Among these, low density polyethylene, straight-chain low density polyethylene, an ethylene-vinyl acetate copolymer, and anethylene-based copolymer obtained by performing copolymerization using metallocene catalyst are preferred.

As the thermoplastic resin used in the heat seal layer, one type of these may be used alone, or a combination of two or more types of these may be used.

The heat seal layer contains fine fillers such as an inorganic fine powder and an organic filler to impart recesses and protrusions on the surface thereof. The type of the fine filler is not particularly limited as long as the fine filler can impart recesses and protrusions on the heat seal layer. Specific examples thereof include the same types that are explained in the section of "Intermediate layer" contained in the thermoplastic resin film of Type A. From the perspective of excellent recess and protrusion formability and low cost, heavy calcium carbonate, light calcium carbonate, alumina, silica, zeolite, and titanium oxide are preferred as the inorganic fine powder. As the organic filler, any of the organic fillers exemplified in the section of "Intermediate layer" described above can be suitably used since the ratio of the major axis and the minor axis (aspect ratio) can be relatively freely set. As the inorganic fine powder and the organic filler, one type of these may be used alone, or a combination of two or more types of these may be used. When two or more types are combined, the combination may be a combination of an inorganic fine powder and an organic filler; however, use of either one of the inorganic fine powder or the organic filler is preferred.

As the fine filler, use of a combination of a fine filler having an aspect ratio of 1 to 1.5 and a fine filler having an aspect ratio of greater than 1.5 but 10 or less is preferred. When only a fine filler having an aspect ratio of 1 to 1.5 is used as the fine filler, increase in the Rzjis is more significant than the increase in the Rk, and the Rzjis/Rk tends to increase. On the other hand, when only a fine filler having an aspect ratio of greater than 1.5 but 10 or less is used as the fine filler, increase in the Rk is more significant than the increase in the Rzjis, and the Rzjis/Rk tends to decrease. By combined use of a fine filler having an aspect ratio of 1 to 1.5 and a fine filler having an aspect ratio of greater than 1.5 but 10 or less as the fine filler, the Rzjis/Rk can be easily adjusted to the predetermined ranges set in the present invention. Note that, when a fine filler having an aspect ratio of greater than 10 is used as the fine filler, the Rk is less likely to be increased and the Rzjis is also less likely to be increased.

In the present specification, "aspect ratio" refers to a value obtained by discretionarily selecting 20 particles that are present close to the center of the observed region by image analysis using a scanning electron microscope to determine a value obtained by dividing a major axis of each particle by a minor axis, and then adding the obtained values for the 20 particles and averaged.

Examples of commercially available product of the inorganic fine powder having an aspect ratio of 1 to 1.5 include Cube 50KAS (manufactured by Bihoku Funka Kogyo Co., Ltd.), and examples of commercially available product of the inorganic fine powder having an aspect ratio of greater than 1.5 but 10 or less include Softon #1800, Softon #1000, BF100, and BF200 (all of these are manufactured by Bihoku Funka Kogyo Co., Ltd.).

The compounded proportion of the fine filler is preferably 15 mass % or greater, and more preferably 20 mass % or greater, relative to the total solid content of the heat seal layer from the perspective of adjusting the Rk to the predetermined range. On the other hand, the compounded proportion of the fine filler is preferably 60 mass % or less, and more preferably 50 mass % or less, relative to the total solid content of the heat seal layer from the perspective of ensuring adhesive strength when the in-mold molding label is adhered to a plastic container. Note that, when the inorganic fine powder and the organic filler are used together, each compounded amount is preferably adjusted in a manner that the total amount thereof becomes the compounded proportion within the range described above.

The average particle size of the inorganic fine powder and the average dispersed particle size of the organic filler are preferably from 1 to 10 μm from the perspective of ease in mixing with the thermoplastic resin. In addition, from the perspective of adjusting the Rk and the Rzjis/Rk to the predetermined ranges, the average particle size of the inorganic fine powder and the average dispersed particle size of the organic filler are more preferably from 2 to 7 μm, and even more preferably from 3 to 6 μm. In addition, from the perspectives of preventing shedding of the inorganic fine powder and the organic filler from the heat seal layer and adjusting the Rk and the Rzjis/Rk to the predetermined ranges, the average particle size of the inorganic fine powder and the average dispersed particle size of the organic filler are preferably from 50% to 1000%, and more preferably from 100% to 500%, relative to the thickness of the heat seal layer contained in the thermoplastic resin film of Type C. Note that the definitions of "average particle size of an inorganic fine powder" and "average dispersed particle size of an organic filler" are as described above in the section of "Intermediate layer" contained in the thermoplastic resin film of Type A.

(ii) Heat Seal Layer Containing at Least Two Types of Thermoplastic Resins that are Incompatible Each Other Next, a heat seal layer containing at least two types of thermoplastic resins that are incompatible each other is described.

The heat seal layer contains at least two types of thermoplastic resins that are incompatible each other to provide recesses and protrusions onto the surface of the heat seal layer. After the at least two types of thermoplastic resins that are incompatible each other are mixed, heat-melted, and then solidified by cooling, a surface with recesses and protrusions are formed spontaneously due to the difference between the thermal shrinkages of thermoplastic resins during the process of the cooling solidification. In the heat seal layer, recesses and protrusions are provided on the surface due to these mechanisms, and thus the Rk and the Rzjis/Rk can be easily adjusted to the ranges set in the present invention.

Note that "incompatible each other" refers to a combination by which melting peak of each thermoplastic resin is observed isolated in differential scanning calorimetry (DSC) of the mixture of the thermoplastic resins.

The combination of the at least two types of the thermoplastic resins that are incompatible each other may be a combination of two types of thermoplastic resins that are incompatible each other or may be a combination of three or more types of thermoplastic resins that are incompatible each other. For "combination of three or more types of thermoplastic resins that are incompatible each other", each thermoplastic resin needs to be incompatible with at least one type of the other thermoplastic resins, and each thermoplastic resin does not need to be incompatible with all the other thermoplastic resins.

In the case of ethylene-based resins, such as high density polyethylenes, medium density polyethylenes, low density polyethylenes, and straight-chain low density polyethylenes, examples of the combination of the thermoplastic resins that are incompatible each other include a combination of propylene homopolymer, a (propylene-ethylene) random copolymer, and the like. In the case of ethylene-based copolymers, such as ethylene-vinyl acetate copolymers, ethylene-(meth)acrylate copolymers, ethylene-alkyl (meth)acrylate copolymers, and ethylene-α-olefin copolymers, examples thereof include a combination with a propylene homopolymer and the like.

Note that the thermoplastic resin of the heat seal layer may only consist of thermoplastic resins that are incompatible each other or may further contain a thermoplastic resin that is compatible with all the thermoplastic resins (compatible resin) in addition to the thermoplastic resins that are incompatible each other. However, the content of the compatible resin is preferably lower than the content of the thermoplastic resins that are incompatible each other. As the compatible resin, the thermoplastic resin can be selected from, for example, the thermoplastic resins that are exemplified in the section of "Heat seal layer" of the thermoplastic resin film of Type A.

Furthermore, among the thermoplastic resins that are incompatible each other in this heat seal layer, the thermoplastic resin(s) that does not have the largest content (mass %) relative to the total mass of the thermoplastic resins contained in the heat seal layer may have a melting point that is equal to or higher than the melting point of the thermoplastic resin contained in the base layer.

Thermoplastic resins that are incompatible each other among the thermoplastic resins contained in the heat seal layer are preferably the component having the largest content and the component having the second largest component, in terms of a content (mass %) relative to the total mass of the thermoplastic resins contained in the heat seal layer. As a result, the Rk and the Rzjis/Rk of the heat seal layer can be easily adjusted to the predetermined ranges. In the description below, when the component of the thermoplastic resin having the largest content and the component of the thermoplastic resin having the second largest content are incompatible each other, the component having the largest content is referred to as "component (A)" and the component having the second largest content is referred to as "component (B)".

From the perspective of adjusting the Rk and the Rzjis/Rk to predetermined ranges, the content ratio of the component (A) to the component (B) [content of component (A)/content of component (B)] is preferably from 80/20 to 55/45, more preferably from 30/70 to 55/45, and even more preferably from 40/60 to 55/45.

From the perspective of adjusting the Rk and the Rzjis/Rk to predetermined ranges, the melting point of the component (B) is preferably higher than the melting point of the component (A), and the difference between the melting point of the component (B) and the melting point of the component (A) is more preferably from 20 to 110° C., and even more preferably from 40 to 90° C. Specifically, the melting point of the component (A) is preferably from 60 to 140° C., and even more preferably from 70 to 120° C. Furthermore, the melting point of the component (B) is preferably from 100 to 200° C., and even more preferably from 120 to 180° C.

A combination of the component (A) and the component (B) can be appropriately selected from "combination of thermoplastic resins that are incompatible each other" described above. Among these, for example, when the component (A) is a straight-chain low density polyethylene and the component (B) is a propylene homopolymer, the increase in the Rzjis is more significant than the increase in the Rk, and the Rzjis/Rk tends to increase. Furthermore, when the component (A) is a straight-chain low density polyethylene and the component (B) is a (propylene-ethylene) random copolymer, the increase in the Rk is more significant than the increase in the Rzjis, and the Rzjis/Rk tends to decrease. The component (A) and the component (B) are preferably selected taking these tendency into consideration.

The heat seal layer containing at least two types of thermoplastic resins that are incompatible each other may further contain a fine filler, such as an inorganic fine powder and an organic filler. This is preferred since the Rk and the Rzjis/Rk can be easily adjusted to the predetermined ranges.

For example, when the component (A) is a straight-chain low density polyethylene and the component (B) is a (propylene-ethylene) random copolymer, a fine filler having an aspect ratio of 1 to 1.5 is preferably added in an amount of 0.5 to 5 mass %, and more preferably 0.8 to 3 mass %, relative to the total solid content of the heat seal layer. By combining the component (A) and the component (B), and the fine filler having an aspect ratio of 1 to 1.5, the Rk increases and the Rzjis/Rk also tends to increase compared to the case of the heat seal layer in which no fine filler is contained although the component (A) and the component (B) are contained, or the case of the heat seal layer in which the component (A) and the component (B) are not combined although the fine filler having an aspect ratio of 1 to 1.5 is contained. As a result, a significant effect that cannot be achieved only by the use of the at least two types of the thermoplastic resins that are incompatible each other, such as the component (A) and the component (B), or the addition of the fine filler having an aspect ratio of 1 to 1.5 can be achieved. Furthermore, when the component (A) is a straight-chain low density polyethylene and the component (B) is a (propylene-ethylene) random copolymer, a fine filler having an aspect ratio of greater than 1.5 but 10 or less is preferably added in an amount of 10 to 35 mass %, and more preferably 15 to 30 mass %, relative to the total solid content of the heat seal layer.

Various publicly known additives may be blended to the heat seal layer contained in the thermoplastic resin film of Type C. The descriptions in the section of "Heat seal layer" contained in the thermoplastic resin film of Type A can be referred to for the type, compounded proportion, and compounding method of the additive suitable for blending into the heat seal layer.

Method of Producing Thermoplastic Resin Film of Type C

The thermoplastic resin film of Type C can be produced by using a forming step of forming a resin composition for a base layer containing a thermoplastic resin and an inorganic fine powder into a film; a resin layer forming step of forming a resin layer containing a thermoplastic resin on the film; and a stretching step of stretching the film at least in a uniaxial direction as necessary to obtain a stretched film. Note that the melting point of the thermoplastic resin of the component (A) contained in the resin layer is a temperature lower than the melting point of the thermoplastic resin contained in the resin composition for the base layer. Furthermore, in the thermoplastic resin film obtained in this production method, the layer originating from the film obtained by forming the resin composition for the base layer corresponds to "base layer" and the layer originating from the resin layer corresponds to the "heat seal layer".

When a heat seal layer containing a fine filler is formed as the heat seal layer, a resin layer is formed by using a resin composition containing a thermoplastic resin and the fine filler. When a heat seal layer is formed from at least two types of thermoplastic resins that are incompatible each other as the heat seal layer, a thermoplastic resin containing the at least two types of the thermoplastic resins that are incompatible each other is used as the thermoplastic resin of the resin layer. For the explanations of the raw materials used in the film and the raw materials used in the resin layer, descriptions of the raw materials of the base layer and the raw materials of the heat seal layer described above can be referred to, respectively. A substance corresponding to the component (A) and the component (B) described above is preferably used as the thermoplastic resin of the resin layer.

In conventional technologies, the ten point height of roughness profile (Rzjis) specified in JIS B0601:2013 Appendix 1 of the back surface is preferably from 3 to 30 μm. However, when a thermoplastic resin film having the Rzjis within this range is used in in-mold molding, dischargeability of air from the space in between the thermoplastic resin film and the molding resin is insufficient, and blisters are generated in some cases. In the present invention, a composition of the heat seal layer such that the Rk and the Rzjis/Rk are adjusted to the particular ranges is employed.

The descriptions for the "Method of producing thermoplastic resin film of Type B" can be referred to as the explanations of the method of forming the film to be the base layer and the lamination technique of the film (resin layer).

When the thermoplastic resin film of Type C is produced, when a fine filler is blended into the thermoplastic resin in order to impart recesses and protrusions onto the surface of the heat seal layer, stretching is preferably performed after the resin layer to be the heat seal layer is subjected to lamination forming. By the stretching, the shape of the fine filler is easily transferred onto the surface of the resin layer to be the heat seal layer (heat seal surface). Furthermore, when the resin layer is stretched, compared to the case where stretching is not performed, it is easier to adjust the Rk and the Rzjis/Rk to the particular ranges even when the amount of the fine filler is small, and the effect of preventing reduction in the adhesive strength in the case where the in-mold molding label is adhered to a plastic container is exhibited.

The descriptions for the "Method of producing thermoplastic resin film of Type B" can be referred to as the explanations of the method of forming the film to be the base layer, and the stretching temperature, stretching speed, stretching ratio, and stretching technique of the film (resin layer).

Similarly, when the thermoplastic resin contained in the heat seal layer is a combination of two or more components that are incompatible resins, stretching is preferably performed after the resin layer to be the heat seal layer is subjected to lamination forming although the surface with recesses and protrusions can be formed spontaneously even without stretching. By employing the stretching, the recesses and protrusions tend to be emphasized on the surface of the resin layer to be the heat seal layer (heat seal surface). At this time, since the component (B) becomes islands in the sea-island structure, the stretching temperature is preferably higher than the melting point of the component (A) and lower than the melting point of the component (B).

Physical Properties of Thermoplastic Resin Film

Thickness

The thickness of the thermoplastic resin film is measured in accordance with JIS K7130:1999 "Plastics—Film and sheeting—Determination of thickness". When the thermoplastic resin film is used in an in-mold molding label, the thickness thereof is preferably 30 μm or greater, more preferably 40 μm or greater, and even more preferably 50 μm or greater, from the perspective of suppressing troubles during printing or during inserting into a mold, by imparting sufficient resilience to the in-mold molding label. Furthermore, from the perspective of falling impact resistance of a large bottle container, the thickness of the thermoplastic resin film is preferably 200 μm or less, more preferably 150 μm or less, and more preferably 100 μm or less.

Density

The density of the thermoplastic resin film is determined as a value in which a basis weight obtained by measurement in accordance with JIS P8124:2011 "Paper and board—Determination of grammage" is divided by the thickness of the thermoplastic resin film. The measurement method described in the section of "Thickness" described above can be referred to for the measurement method for the thickness of the thermoplastic resin film.

When the thermoplastic resin film is used in an in-mold molding label, the density of the thermoplastic resin film is preferably 0.6 g/cm$^3$ or greater, more preferably 0.65 g/cm$^3$ or greater, and even more preferably 0.7 g/cm$^3$ or greater, from the perspective of suppressing troubles during printing or during inserting into a mold, by imparting sufficient resilience to the in-mold molding label. From the perspective of reducing weight of the in-mold molding label, the density of the thermoplastic resin film is preferably 0.95 g/cm$^3$ or less, more preferably 0.9 g/cm$^3$ or less, and even more preferably 0.85 g/cm$^3$ or less. When the thermoplastic resin film is used as the in-mold molding label, an orange peel pattern may appear on the appearance of the label after the molding; however, when the orange peel pattern is unnecessary as a design, a relatively high value in the range described above (0.8 g/cm$^3$ or greater) needs to be selected as the density of the thermoplastic resin film, and when the orange peel pattern is required as a design, a relatively low value in the range described above (less than 0.8 g/cm$^3$) needs to be selected.

Surface Resistivity

The surface resistivity is a resistivity measured using electrodes of the double-ring method in accordance with JIS K-6911:1995 "Testing methods for thermosetting plastics" at 23° C. and a relative humidity of 50%.

The surface resistivity of the surface (front surface) on the other side against the heat seal layer surface of the thermoplastic resin film is preferably $1 \times 10^8 \Omega$ or greater, more preferably $5 \times 10^8 \Omega$ or greater, and even more preferably $1 \times 10^9 \Omega$ or greater. Furthermore, the surface resistivity of the front surface of the thermoplastic resin film is preferably $1 \times 10^{12} \Omega$ or less, more preferably $5 \times 10^{11} \Omega$ or less, and even more preferably $1 \times 10^{11} \Omega$ or less. As a result, transport of two or more sheets of films or labels that are stacked on one another (multi feed) is suppressed during the printing of the thermoplastic resin film, the label production, or the in-mold molding, and falling of a label during feeding of the label to a mold for in-mold molding using a charged inserter is less likely to occur.

In-Mold Molding Label

The in-mold molding label of the present invention contains the thermoplastic resin film of the present invention. For the explanation of the thermoplastic resin film, the description in the section of "Thermoplastic resin film" above can be referred to.

Printing

On the front surface of the in-mold molding label of the present invention, for example, a bar code, manufacturer, dealer, characters, brand name, method of use, and the like may be printed. In this case, printing applicability is preferably imparted on the front surface of the thermoplastic resin film provided for the in-mold molding label. Examples of the method thereof include surface treatments, such as surface oxidation treatments such as corona discharge, and coating of substances having excellent ink fixability. For the printing, techniques such as gravure printing, offset printing, flexographic printing, seal printing, and screen printing can be employed.

With the in-mold molding label formed from conventional thermoplastic resin film, embossed pattern tends to appear noticeably when solid printing is performed on the front surface since the embossing shape of the back surface is firmly transferred onto the front surface. On the other hand, with the in-mold molding label using the thermoplastic resin film of the present invention, the embossing pattern does not appear at all or is not noticeable even if the embossing pattern appears on the printed surface, and printed information can be suitably provided.

Punching

The in-mold molding label can be obtained by separating the in-mold molding label in a required shape and size by punching of the thermoplastic resin film of the present invention. When printed information is provided on the label, the punching may be performed on the thermoplastic resin film before the printing or may be performed on the thermoplastic resin film after the printing; however, the punching is often performed on the thermoplastic resin film after the printing. The punched in-mold molding label may be a label that is adhered on the entire surface of the plastic container surface or may be a label that is partially adhered to a part of the plastic container surface. For example, the in-mold molding label may be used as a blank label that wraps around a side surface of a plastic container in a cup shape formed by injection molding or may be used as a label adhered on the front surface or the back surface of the plastic container in a bottle shape formed by blow molding.

Plastic Container with Label and Production Method Thereof

The plastic container with a label of the present invention has the label for mold molding of the present invention and a plastic container body on which the label for mold molding has been adhered.

For the explanation of the label for mold molding, the description in the section of "In-mold molding label" above can be referred to.

Plastic Container

Examples of the raw material of the plastic container include polyester-based resins, such as polyethylene terephthalate (PET) and copolymers thereof; polyolefin-based resins, such as polypropylene (PP) and polyethylene (PE); polycarbonate-based resins; and the like. Among these, from the perspective of ease in blow molding of the resin, use of a polyester-based resin or a polyolefin-based resin is preferred. In addition, use of a thermoplastic resin composition containing such a thermoplastic resin as a main component is preferred.

The body of the plastic container may have a cross section having a shape of true circle, ellipse, or rectangle. In the case where the cross section is a rectangle, the edges thereof are preferably curved. From the perspective of strength, the cross section of the body is preferably a true circle or an ellipse that is substantially a true circle, and is most preferably a true circle.

In-Mold Molding (Method of Producing Plastic Container with Label)

Examples of the method of adhering the in-mold molding label to a plastic container include a method in which the in-mold molding label is adhered to a resin at the same time as the molding during the process such as blow molding, injection molding, and differential pressure molding.

For example, in the blow molding, the in-mold molding label is disposed in a cavity of at least one of molds in a manner that the back surface of the label faces toward the cavity side in the mold (in a manner that the front surface is in contact with the mold) and then fixed to the inner wall of the mold by suction or static electricity. Thereafter, a molten material of a parison or preform of the resin which is the molding material of the container is introduced into the mold, and subjected to blow molding by a conventional method after the mold is closed, to form a plastic container with a label in which the label has been fused onto the outer wall of the plastic container.

For example, in the injection molding, the in-mold molding label is disposed in a cavity of a female mold in a manner that the back surface of the label faces toward the cavity side in the mold (in a manner that the front surface is in contact with the mold) and then fixed to the inner wall of the mold by suction or static electricity. After the mold is closed, a molten material of the resin to be the molding material of the container is injected into the mold to mold a container, thereby forming a plastic container with a label in which the label has been fused onto the outer wall of the plastic container. For example, in the differential pressure molding, the in-mold molding label is disposed in a cavity of a bottom female mold of differential pressure molds in a manner that the back surface of the label faces toward the cavity side in the mold (in a manner that the front surface is in contact with the mold) and then fixed to the inner wall of the mold by suction or static electricity. Thereafter, a molten material of a resin sheet which is the molding material of the container is introduced above the bottom female mold, and subjected to differential pressure molding by a conventional method to form a plastic container with a label in which the label has been fused onto the outer wall of the plastic container. The differential pressure molding may be any of vacuum molding or pressure molding; however, typically, differential pressure molding employing both of these and utilizing plug assist is preferred.

The in-mold molding label of the present invention is especially advantageous as an in-mold molding label used for plastic blow molding or injection molding when the molding of the resin in the container is performed at a low temperature.

Adhesive Strength

The adhesive strength between the plastic container body and the label is measured in accordance with JIS K 6854-3:1999 "Adhesives—Determination of peel strength of bonded assemblies—Part 3: Adhesives—180° peel test for flexible-to-flexible bonded assemblies (T-peel test)". Under the conditions where blisters are not formed, the adhesive strength is preferably 2 N/15 mm or greater, more preferably 4 N/15 mm or greater, and even more preferably 6 N/15 mm or greater.

EXAMPLES

The characteristics of the present invention are described in further detail below referring to examples and comparative examples.

The materials, used amounts, proportions, treatment contents, treatment procedures, and the like described in the examples below may be varied as appropriate provided that they do not deviate from the spirit of the present invention. Therefore, the scope of the present invention should not be limited by the specific examples given below.

Evaluation Methods

Thickness

The thickness of the thermoplastic resin film was measured by a constant-pressure thickness measurement instrument (PG-01J, manufactured by Teclock Corporation) in accordance with JIS K7130:1999.

Basis Weight

The basis weight of the thermoplastic resin film was measured by weighing a sample punched out to a size of 100 mm×100 mm with an electronic balance in accordance with JIS P 8124:2011 "Paper and Paperboard—Method for Measuring Weight".

Density

The density of the thermoplastic resin film was determined as a value determined by dividing the basis weight obtained above by the thickness obtained above.

Oken Smoothness

The Oken smoothness of the thermoplastic resin film was measured using the Digital Oken type Air-permeability & Smoothness Tester (EYO-55-1M, manufactured by Asahi Seiko Co., Ltd.) in accordance with JIS P 8155:2010 "Paper and board—Determination of smoothness—Oken method".

Ten Point Height of Roughness Profile Rzjis

The surface roughness Rzjis of the heat seal layer surface of the thermoplastic resin film was determined by measuring the heat seal surface of a cut label (50 mm×50 mm) with a measurement length of 30 mm using a surface texture measuring instrument (SURFCOM 1500DX, manufactured by Tokyo Seimitsu Co., Ltd.), in accordance with JIS B0601:2013 Appendix 1.

Aspect Ratio of Fine Filler

A sample for measurement was produced by cutting the thermoplastic resin film using a microtome (RM2265, manufactured by Leica Biosystems), and an observation image of the heat seal layer cross section of the thermoplastic resin film was obtained by a scanning electron microscope (SM-200, manufactured by Topcon Corporation) at an acceleration voltage of 10 kV. Thereafter, 20 particles were discretionarily selected from the observed region to determine the maximum diameter and the minimum diameter for each particle using an image analyzer (LUZEX AP, manufactured by Nireco Corporation), and an aspect ratio of each particle was calculated by dividing the maximum diameter by the minimum diameter. The average value of the obtained aspect ratios of the 20 particles was calculated and used as the aspect ratio of the fine filler.

Arithmetic Mean Roughness Ra, Core Roughness Depth Rk, Reduced Peak Height Rpk, and Reduced Valley Depth Rvk The surface shape of the heat seal layer surface of the thermoplastic resin film was determined by measuring the three dimensional surface shape in the planar direction using a non-contact 3D optical surface profiler (New View 5010, manufactured by Zygo Corporation) in accordance with ISO 13565-1:1996 under the following conditions: measured area of 2 mm×2 mm, object lens magnification of 20 times, and wavelength equal to or less than 14 μm, cut, and analyzed using an analytical software (Metro Pro, manufactured by Zygo Corporation) in accordance with ISO 13565-2:1996.

Printing Evaluation

The in-mold molding label obtained in each of examples and comparative examples was slit into narrower rolls, and four-color printing of character information, such as trade name, manufacturer, dealer, method of use, and precaution, and patterns including barcode, and design was performed on one side of the small rolls using a flexographic printer (TCL, manufactured by Taiyo Kikai Ltd.) and an ultraviolet curable flexographic inks (UV Flexographic CF, manufactured by T&K Toka Co., Ltd.) at a temperature of 23° C. and a relative humidity of 50% at a speed of 60 m/min. Thereafter, this was passed under an ultraviolet curing unit (manufactured by Eye Graphics Co., Ltd.; metal halide lamp; 100 W/cm; 1 lamp) at a speed of 60 m/min to dry the ink on the printed surface to obtain a flexographic printed material.

Suitability Evaluation (Visual Observation):

Excellent: (failure in appearance was not observed by a loupe)

Good: (contour of a character was blurred when observed by a loupe)

Marginal: (defect in contour of a character was observed by a loupe)

Poor: (unprinted white part was observed by the visual observation)

In-Mold Suitability Evaluation

The in-mold molding label obtained in each of examples or comparative examples was punched out in a rectangular shape having a width of 120 mm and a length of 150 mm and used as a label used in production of a plastic container with a label.

This label was disposed on one side of a blow molding mold that can mold a bottle with an internal capacity of 3 L in a manner that the heat seal layer faced toward the cavity side and was fixed onto the mold by suction. Thereafter, a high density polyethylene (Novatec HD HB420R, manufactured by Japan Polyethylene Corporation; MFR (JIS K7210: 1999)=0.2 g/10 min, melting peak temperature (JIS K7121: 2012)=133° C., crystallization peak temperature (JIS K7121:2012)=115° C., density (JIS K7112:1999)=0.956 g/cm$^3$) was melted at 160° C. and extruded into a parison in the mold, and the part of the parison where the label was adhered was adjusted to 160° C. After the mold was closed, 4.2 kg/cm$^2$ of pressurized air was supplied into the parison, and the parison was expanded for 16 seconds and bring the parison into contact with the mold to form it into a container shape and was fused with the label. The molded product was then cooled in the mold, and the mold was opened to obtain a plastic container with a label. At this time, the mold cooling temperature was 20° C. and the shot cycle time was 38 sec/cycle, and the appearance and the adhesive strength of the plastic container with the label was evaluated.

Adhesive Strength Evaluation

After the plastic container with a label was stored at 23° C. and a relative humidity of 50% for 1 week, the part where the label was adhered of the plastic container with the label was cut into a strip with a width of 15 mm and the adhesive strength between the label and the container was determined by T-peel test at a tensile speed of 300 mm/min using a tensile tester (Autograph AGS-D, manufactured by Shimadzu Corporation) in accordance with JIS K 6854-3:1999.

Suitability Evaluation (Visual Observation):

Excellent: (failure in appearance was not observed)

Good: (slight failure in appearance occurred but peeling was not observed)

Marginal: (orange peel pattern was formed but peeling was not observed, and there was no practical problem)

Poor: (failure in appearance due to blisters and position shifts occurred)

Production Example of Thermoplastic Resin Film (1)

The raw materials used in the production of the thermoplastic resin films in examples and comparative examples are shown in Table 1.

TABLE 1

| Abbreviation code | Content |
|---|---|
| PP1 | Propylene homopolymer (trade name: Novatec PP MA4, manufactured by Japan Polypropylene Corporation; MFR (JIS-K7210) = 5 g/10 min; melting point (JIS-K7121) = 167° C.) |
| PP2 | Propylene homopolymer (trade name: Novatec PP MA3, manufactured by Japan Polypropylene Corporation; MFR (JIS-K7210) = 11 g/10 min; melting point (JIS-K7121) = 167° C.) |
| PP3 | Propylene homopolymer (trade name: Novatec PP FY6, manufactured by Japan Polypropylene Corporation; MFR (JIS-K7210) = 2.5 g/10 min; melting point (JIS-K7121) = 167° C.) |
| PP4 | Propylene-α-olefin copolymer (trade name: Wintec PP WFX6, manufactured by Japan Polypropylene Corporation; MFR (JIS-K7210) = 2.0 g/10 min; melting point (JIS-K7121) = 124° C.) |
| PE1 | Metallocene-based polyethylene (trade name: Harmorex NJ744N, manufactured by Japan Polyethylene Corporation; MFR (JIS-K7210) = 12 g/10 min; density = 0.911 g/cm$^3$; melting point (JIS-K7121) = 120° C.; crystallization point (JIS-K7121) = 95° C.) |
| PE2 | Metallocene-based polyethylene (trade name: Harmorex NF444N, manufactured by Japan Polyethylene Corporation; MFR (JIS-K7210) = 2 g/10 min; density = 0.912 g/cm$^3$; melting point (JIS-K7121) = 121° C.; crystallization point (JIS-K7121) = 95° C.) |
| PE3 | Metallocene-based polyethylene (trade name: Engage 8401, manufactured by The Dow Company; MFR (ASTM D1238) = 30 g/10 min, density = 0.885 g/cm$^3$; melting point (JIS-K7121) = 81° C.) |
| CA1 | Heavy calcium carbonate (trade name: Softon #1800, manufactured by Bihoku Funka Kogyo Co., Ltd.; average particle size: 1.25 μm; aspect ratio = 1.78) |
| CA2 | Heavy calcium carbonate (trade name: Softon #1000, manufactured by Bihoku Funka Kogyo Co., Ltd.; average particle size: 2.2 μm; aspect ratio = 1.61) |
| CA3 | Heavy calcium carbonate (trade name: BF 100, manufactured by Bihoku Funka Kogyo Co., Ltd.; average particle size: 3.6 μm; aspect ratio = 1.80) |

TABLE 1-continued

| Abbreviation code | Content |
|---|---|
| CA4 | Heavy calcium carbonate (trade name: BF 200, manufactured by Bihoku Funka Kogyo Co., Ltd.; average particle size: 5 μm; aspect ratio = 1.95) |
| CA5 | Light calcium carbonate (trade name: CUBE-50KAS, manufactured by Maruo Calcium Co., Ltd.; average particle size: 5.7 μm; aspect ratio = 1.26) |
| TIO | Rutile titanium dioxide (trade name: Tipaque CR-60, manufactured by Ishihara Sangyo Kaisya, Ltd.: average particle size = 0.2 μm) |

The composition and the stretching conditions in the production of the thermoplastic resin films and the physical properties of the obtained thermoplastic resin films in the examples and comparative examples are shown in Table 2.

TABLE 2

| | Composition | | | | | | | | | | | | |
|---|---|---|---|---|---|---|---|---|---|---|---|---|---|
| | Base layer | | | | Intermediate layer | | | | | | | | |
| | PP1 (wt. %) | PE1 (wt. %) | CA1 (wt. %) | TIC (wt. %) | PP1 (wt. %) | PP2 (wt. %) | PP3 (wt. %) | PE1 (wt. %) | CA1 (wt. %) | CA2 (wt. %) | CA3 (wt. %) | CA4 (wt. %) | TIC (wt. %) |
| Example 1 | 83 | — | 16 | 1 | — | 25 | 14 | — | 60 | — | — | — | 1 |
| Example 2 | 83 | — | 16 | 1 | — | 39 | — | — | 60 | — | — | — | 1 |
| Example 3 | 83 | — | 16 | 1 | — | — | — | 69 | — | 30 | — | — | 1 |
| Example 4 | 83 | — | 16 | 1 | — | — | — | 69 | 30 | — | — | — | 1 |
| Example 5 | 83 | — | 16 | 1 | — | 25 | 14 | — | 40 | — | 20 | — | 1 |
| Example 6 | 83 | — | 16 | 1 | — | 25 | 14 | — | 40 | — | — | 20 | 1 |
| Example 7 | 83 | — | 16 | 1 | 44 | — | — | — | 55 | — | — | — | 1 |
| Example 8 | 83 | — | 16 | 1 | — | — | — | 84 | 15 | — | — | — | 1 |
| Example 9 | 83 | — | 16 | 1 | 54 | — | — | — | 45 | — | — | — | 1 |
| Example 10 | 83 | — | 16 | 1 | 54 | — | — | — | 45 | — | — | — | 1 |
| Example 11 | 83 | — | 16 | 1 | 54 | — | — | — | 45 | — | — | — | 1 |
| Example 12 | 73 | — | 22 | 5 | — | 99 | — | — | 1 | — | — | — | — |
| Example 13 | 73 | — | 22 | 5 | — | 99 | — | — | 1 | — | — | — | — |
| Example 14 | 100 | — | — | — | — | — | — | — | — | — | — | — | — |
| Example 15 | 73 | — | 22 | 5 | — | 99 | — | — | 1 | — | — | — | — |
| Example 16 | 100 | — | — | — | — | — | — | — | — | — | — | — | — |
| Example 17 | 100 | — | — | — | — | — | — | — | — | — | — | — | — |
| Example 18 | 100 | — | — | — | — | — | — | — | — | — | — | — | — |
| Comparative Example 1 | 76 | — | 23 | 1 | 54 | — | — | — | 45 | — | — | — | 1 |
| Comparative Example 2 | 83 | — | 16 | 1 | 54 | — | — | — | 45 | — | — | — | 1 |
| Comparative Example 3 | 83 | — | 16 | 1 | 100 | — | — | — | — | — | — | — | — |
| Comparative Example 4 | 83 | — | 16 | 1 | — | — | — | 69 | — | — | — | — | 1 |
| Comparative Example 5 | 100 | — | — | — | — | — | — | — | — | — | — | — | — |
| Comparative Example 6 | 100 | — | — | — | — | — | — | — | — | — | — | — | — |
| Comparative Example 7 | 100 | — | — | — | — | — | — | — | — | — | — | — | — |
| Comparative Example 8 | 100 | — | — | — | — | — | — | — | — | — | — | — | — |

| | Composition Heat seal layer | | | | | | | Stretching conditions | | | |
|---|---|---|---|---|---|---|---|---|---|---|---|
| | | | | | | | | Machine-direction stretching | | Transverse-direction stretching | |
| | PE1 (wt. %) | PE2 (wt. %) | PE3 (wt. %) | PP3 (wt. %) | PP4 (wt. %) | CA1 (wt. %) | CA2 (wt. %) | CA5 (wt. %) | Temperature (° C.) | Ratio (times) | Temperature (° C.) | Ratio (times) |
| Example 1 | — | 100 | — | — | — | — | — | — | 140 | 4 | 160 | 9 |
| Example 2 | 50 | 50 | — | — | — | — | — | — | 140 | 4 | 160 | 9 |
| Example 3 | 100 | — | — | — | — | — | — | — | 140 | 4 | 160 | 9 |
| Example 4 | 10 | — | — | — | — | — | — | — | 140 | 4 | 160 | 9 |
| Example 5 | 100 | — | — | — | — | — | — | — | 140 | 4 | 160 | 9 |
| Example 6 | 100 | — | — | — | — | — | — | — | 140 | 4 | 160 | 9 |
| Example 7 | 100 | — | — | — | — | — | — | — | 140 | 4 | 160 | 9 |
| Example 8 | 100 | — | — | — | — | — | — | — | 140 | 4 | 160 | 9 |
| Example 9 | 70 | — | — | — | — | 30 | — | — | 135 | 4 | 155 | 9 |
| Example 10 | 85 | — | — | — | — | 15 | — | — | 140 | 4 | 160 | 9 |
| Example 11 | 100 | — | — | — | — | — | — | — | 135 | 5 | 155 | 9 |
| Example 12 | 100 | — | — | — | — | — | — | — | 140 | 5 | 170 | 8 |

TABLE 2-continued

| | | | | | | | | | | | | |
|---|---|---|---|---|---|---|---|---|---|---|---|---|
| Example 13 | 100 | — | — | — | — | — | — | — | 135 | 5 | 165 | 8 |
| Example 14 | 100 | — | — | — | — | — | — | — | 140 | 4 | 155 | 9 |
| Example 15 | — | — | 76 | — | — | — | 18 | 6 | 135 | 5 | 165 | 8 |
| Example 16 | — | — | 50 | 50 | — | — | — | — | 140 | 4 | 155 | 9 |
| Example 17 | — | — | 60 | — | 40 | — | — | — | 140 | 4 | 155 | 9 |
| Example 18 | — | — | 59 | — | 40 | — | — | 1 | 140 | 4 | 155 | 9 |
| Comparative Example 1 | 100 | — | — | — | — | — | — | — | 140 | 4 | 160 | 9 |
| Comparative Example 2 | 100 | — | — | — | — | — | — | — | 140 | 4 | 160 | 9 |
| Comparative Example 3 | 100 | — | — | — | — | — | — | — | 140 | 4 | 160 | 9 |
| Comparative Example 4 | 100 | — | — | — | — | — | — | — | 140 | 4 | 160 | 9 |
| Comparative Example 5 | — | — | 90 | — | — | — | 10 | — | 140 | 4 | 155 | 9 |
| Comparative Example 6 | — | — | 99 | — | — | — | — | 1 | 140 | 4 | 155 | 9 |
| Comparative Example 7 | — | — | 88 | 12 | — | — | — | — | 140 | 4 | 155 | 9 |
| Comparative Example 8 | — | — | 90 | — | 10 | — | — | — | 140 | 4 | 155 | 9 |

| | Physical properties | | | | | | | | | |
|---|---|---|---|---|---|---|---|---|---|---|
| | Thickness (μm) | Density (g/cm³) | Smoothness (second) | Ra (μm) | Rzjis (μm) | Rk (μm) | Rpk (μm) | Rvk (μm) | Mrl (%) | Rzjis/Rk (—) |
| Example 1 | 76 | 0.81 | 5664 | 1.33 | 17.63 | 3.79 | 1.24 | 2.64 | 8.34 | 4.65 |
| Example 2 | 75 | 0.83 | 3923 | 1.32 | 16.40 | 3.86 | 1.19 | 2.46 | 8.43 | 4.25 |
| Example 3 | 84 | 0.80 | 121 | 0.97 | 18.96 | 3.04 | 1.52 | 0.99 | 11.33 | 6.24 |
| Example 4 | 81 | 0.82 | 3440 | 0.82 | 9.24 | 2.61 | 1.05 | 0.97 | 9.68 | 3.54 |
| Example 5 | 92 | 0.77 | 580 | 1.70 | 26.78 | 5.25 | 2.01 | 2.71 | 8.77 | 5.10 |
| Example 6 | 92 | 0.75 | 159 | 1.76 | 31.96 | 5.22 | 2.46 | 3.07 | 9.49 | 6.12 |
| Example 7 | 85 | 0.75 | 10220 | 0.94 | 22.91 | 2.73 | 1.24 | 2.02 | 11.04 | 8.38 |
| Example 8 | 82 | 0.81 | 9186 | 0.82 | 11.5 | 2.62 | 1.17 | 0.91 | 10.18 | 4.39 |
| Example 9 | 83 | 0.75 | 384 | 0.91 | 18.62 | 2.76 | 1.28 | 1.47 | 10.76 | 6.74 |
| Example 10 | 75 | 0.83 | 574 | 0.77 | 17.06 | 2.34 | 1.19 | 1.15 | 11.72 | 7.28 |
| Example 11 | 85 | 0.76 | 2820 | 0.92 | 20.23 | 3.12 | 2.23 | 2.83 | 9.75 | 6.48 |
| Example 12 | 115 | 0.86 | 20 | 3.84 | 24.95 | 7.12 | 1.06 | 8.38 | 4.07 | 3.50 |
| Example 13 | 115 | 0.78 | 30 | 5.06 | 25.08 | 8.52 | 1.31 | 8.64 | 3.71 | 2.94 |
| Example 14 | 200 | 0.92 | 28 | 4.83 | 23.28 | 8.11 | 1.26 | 8.54 | 3.81 | 2.87 |
| Example 15 | 112 | 0.85 | 11730 | 0.38 | 10.83 | 1.24 | 0.52 | 0.50 | 11.46 | 8.74 |
| Example 16 | 200 | 0.93 | 175 | 0.77 | 13.54 | 2.23 | 1.54 | 0.62 | 14.67 | 6.07 |
| Example 17 | 200 | 0.93 | 4609 | 0.41 | 3.38 | 1.32 | 0.53 | 0.41 | 10.29 | 2.56 |
| Example 18 | 200 | 0.93 | 2224 | 0.496 | 5.04 | 1.59 | 0.73 | 0.46 | 11.24 | 3.17 |
| Comparative Example 1 | 83 | 0.76 | 150 | 3.15 | 18.76 | 9.52 | 2.20 | 2.12 | 16.96 | 1.97 |
| Comparative Example 2 | 110 | 0.79 | 15000 | 0.36 | 3.86 | 1.17 | 0.47 | 0.34 | 11.89 | 3.29 |
| Comparative Example 3 | 70 | 0.80 | 63795 | 0.34 | 9.50 | 1.08 | 0.48 | 0.40 | 11.07 | 8.79 |
| Comparative Example 4 | 92 | 0.73 | 7 | 1.07 | 34.38 | 3.26 | 1.96 | 1.31 | 10.68 | 10.54 |
| Comparative Example 5 | 200 | 0.92 | 176 | 0.26 | 9.55 | 0.60 | 0.93 | 0.18 | 16.10 | 15.92 |
| Comparative Example 6 | 200 | 0.92 | 99999 | 0.12 | 2.54 | 0.38 | 0.19 | 0.14 | 10.98 | 6.68 |
| Comparative Example 7 | 200 | 0.92 | 8960 | 0.18 | 8.35 | 0.53 | 0.38 | 0.21 | 11.39 | 15.75 |
| Comparative Example 8 | 200 | 0.93 | 99999 | 0.12 | 2.37 | 0.38 | 0.22 | 0.13 | 12.07 | 6.24 |

Example 1

A raw material for a base layer, in which 83 mass % of PP1, 16 mass % of CA1, and 1 mass % of TIO were mixed as shown in Table 1, was melt-kneaded in an extruder set at 250° C., supplied to a T-die set at 250° C., extruded into a sheet shape, and then cooled to approximately 60° C. using a cooling roll to obtain an unstretched sheet. The unstretched sheet was then heated again using a heating roll in a manner that the temperature of the sheet surface became 140° C., stretched four times in the machine direction utilizing the difference in circumferential speeds of a group of rolls, and cooled using a cooling roll in a manner that the temperature of the sheet surface became approximately 60° C. to obtain a sheet stretched four times.

A raw material for an intermediate layer in which 25 mass % of PP2, 14 mass % of PP3, 60 mass % of CA1, and 1 mass % of TIO were mixed as shown in Table 1 and a raw material for a heat seal layer formed from PE2 shown in Table 1 were melt-kneaded using two separate extruders set at 230° C., then extruded into a sheet shape from a T-die set at 230° C. The obtained sheets were laminated onto the sheet stretched four times to obtain a laminate sheet having a three-layer structure of base layer/intermediate layer/heat seal layer.

Next, after this laminate sheet was heated again in a manner that the temperature of the sheet surface became 160° C. using a tenter oven and stretched nine times in the transverse direction using a tenter, annealing treatment was further performed on the sheet with a heat set zone adjusted to 170° C., and the sheet was then cooled to approximately 60° C. with a cooling roll. The edges of the sheet were slit to obtain a biaxially stretched resin film having a three-layer structure.

This was then guided into a corona discharge treatment device by guide rollers, and corona discharge treatment was performed in a treatment dose of 50 W·min/m² on the surface on the base layer side, and taken up by a winder. This was used as a thermoplastic resin film.

The material ratio curve of the obtained thermoplastic resin film is shown in FIG. 2. The obtained thermoplastic resin film had a thickness of 76 μm, a density of 0.81 g/cm³, a smoothness of 5664 seconds, and the surface roughness parameters were as follows: Ra: 1.33 μm; Rzjis 17.63 μm; Rk 3.79 μm; Rpk 1.24 μm; Rvk 2.64 μm; Rzjis/Rk: 4.65.

Examples 2 to 10 and Comparative Examples 2 to 4

Figure 5:
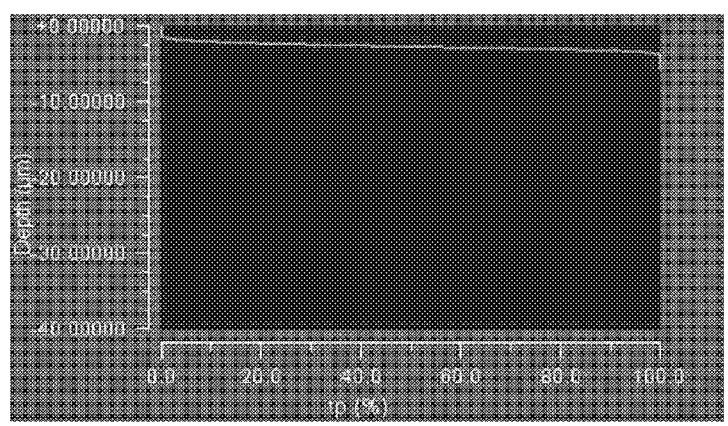
FIG. 5 is a drawing showing another material ratio curve in Comparative Example 2 of the present invention.

A thermoplastic resin film was obtained in the same manner as in Example 1 except for changing the raw materials for a base layer, raw materials for an intermediate layer, raw materials for a heat seal layer, machine-direction stretching temperature, and transverse-direction stretching temperature of Example 1 to those shown in Table 2. The thicknesses, densities, smoothnesses, and parameters of surface roughness of these thermoplastic resin films are as shown in Table 1. The material ratio curve of the thermoplastic resin film of Example 5 is shown in FIG. 3. Furthermore, the material ratio curve of the thermoplastic resin film of Comparative Example 2 is shown in FIG. 5.

Example 11 and Comparative Example 1

Raw materials for a base layer and raw materials for an intermediate layer, in which the raw materials shown in Table 1 were mixed in the proportions shown in Table 2, were separately melt-kneaded in two separate extruders set at 250° C., supplied to a T-die set at 250° C., laminated in the T-die, extruded into a sheet shape, and then cooled to approximately 60° C. using a cooling roll to obtain an unstretched sheet. Next, the unstretched sheet was heated again to the machine-direction stretching temperature shown in Table 2, stretched in the machine direction in the stretching ratio shown in Table 2 utilizing the difference in circumferential speed of a group of rolls, and cooled to approximately 60° C. with a cooling roll to obtain a stretched sheet.

PE1 of the raw material for a heat seal layer was then melt-kneaded in an extruder set at 230° C., then extruded into a sheet shape from a T-die set at 230° C., and laminated on the surface of the intermediate layer side of the sheet stretched four times. The laminate was guided into a space in between a metal cooling roll provided with a gravure embossing pattern of #150 lines and a matte rubber roll in a manner that the heat seal layer side was in contact with the metal cooling roll, and the embossing pattern was transferred onto the heat seal layer side by compressing the rolls. The laminate was then cooled with a cooling roll to obtain a laminate sheet having a three-layer structure of base layer/intermediate layer/heat seal layer.

Next, after this laminate sheet was heated again under the transverse-direction stretching conditions shown in Table 2 using a tenter oven and stretched nine times in the transverse direction using a tenter, annealing treatment was further performed on the sheet with a heat set zone adjusted to 160° C., and the sheet was then cooled to approximately 60° C. with a cooling roll. The edges of the sheet were slit to obtain a biaxially stretched resin film having a three-layer structure.

This was then guided into a corona discharge treatment device by guide rollers, and corona discharge treatment was performed in a treatment dose of 50 W·min/m² on the surface on the base layer side, and taken up by a winder. This was used as a thermoplastic resin film.

The thicknesses, densities, smoothnesses, and parameters of surface roughness of these thermoplastic resin films are as shown in Table 2. The material ratio curve of the thermoplastic resin film of Comparative Example 1 is shown in FIG. 4.

Examples 12 and 13

Raw materials for a base layer in which 73 mass % of PP1, 22 mass % of CA1, and 5 mass % of TIO shown in Table 1 were mixed and raw materials for an intermediate layer in which 99 mass % of PP2 and 1 mass % of CA1 shown in Table 1 were mixed were separately melt-kneaded in extruders set at 250° C., supplied to a T-die set at 250° C., laminated in the T-die, extruded into a sheet shape, and then cooled to approximately 60° C. using a cooling roll to obtain an unstretched sheet. The unstretched sheet was then heated again to the machine-direction stretching temperature shown in Table 2, stretched five times in the machine direction utilizing the difference in circumferential speed of a group of rolls.

After this stretched sheet was heated again under the transverse-direction stretching conditions shown in Table 2 using a tenter oven and stretched eight times in the transverse direction using a tenter, annealing treatment was further performed on the sheet with a heat set zone adjusted to 160° C., and the sheet was then cooled to approximately 60° C. with a cooling roll. The edges of the sheet were slit to obtain a laminated biaxially stretched sheet having a two-layer structure of base layer/intermediate layer.

A heat seal layer resin formed from PE1 shown in Table 1 was then melt-kneaded in an extruder set at 230° C., then extruded into a sheet shape from a T-die set at 230° C., and laminated on the surface of the intermediate layer side of the laminated biaxially stretched sheet. The laminate was guided into a space in between a metal cooling roll provided with a gravure embossing pattern of #25 lines and 25 μm depth and a matte rubber roll, and the embossing pattern was transferred onto the heat seal layer side by compressing the rolls. The laminate was then cooled by a cooling roll to obtain a laminate sheet having a three-layer structure of base layer/intermediate layer/heat seal layer.

The laminate sheet was then guided into a corona discharge treatment device by guide rollers, and corona discharge treatment was performed in a treatment dose of 50 W·min/m² on the surface on the base layer side, and taken up by a winder. This was used as a thermoplastic resin film.

The thicknesses, densities, smoothnesses, and parameters of surface roughness of these thermoplastic resin films are as shown in Table 2.

Example 14

A raw material for a base layer formed from PP1 shown in Table 1 was melt-kneaded in an extruder set at 210° C., supplied to a T-die set at 250° C., extruded into a sheet shape from the T-die, and then cooled to approximately 60° C. using a cooling roll to obtain an unstretched sheet. Next, the unstretched sheet was heated again to 140° C., stretched four times in the machine direction utilizing the difference in circumferential speed of a group of rolls.

Next, after this stretched sheet was heated again to 155° C. using a tenter oven and stretched nine times in the transverse direction using a tenter, annealing treatment was further performed on the sheet with a heat set zone adjusted to 160° C., and the sheet was then cooled to approximately 60° C. with a cooling roll. The edges of the sheet were slit to obtain a transparent biaxially stretched sheet of the base layer.

A heat seal layer resin formed from PE1 shown in Table 1 was then melt-kneaded in an extruder set at 230° C., then extruded into a sheet shape from a T-die set at 230° C., and laminated on one surface of the transparent biaxially stretched sheet. The laminate was guided into a space in between a metal cooling roll provided with a gravure embossing pattern of #25 lines and 25 μm depth and a matte rubber roll, and the embossing pattern was transferred onto the heat seal layer side by compressing the rolls. The laminate was then cooled by a cooling roll to obtain a laminate sheet having a two-layer structure of base layer/heat seal layer.

The laminate sheet was then guided into a corona discharge treatment device by guide rollers, and corona discharge treatment was performed in a treatment dose of 50 W·min/m² on the surface on the base layer side, and taken up by a winder. This was used as a thermoplastic resin film.

The thickness, density, smoothness, and parameters of surface roughness of the thermoplastic resin film are as shown in Table 2.

Example 15

Raw materials for a base layer in which 73 mass % of PP1, 22 mass % of CA1, and 5 mass % of TIO shown in Table 1 were mixed and raw materials for an intermediate layer in which 99 mass % of PP2 and 1 mass % of CA1 shown in Table 1 were mixed were separately melt-kneaded in extruders set at 250° C., supplied to a T-die set at 250° C., laminated in the T-die, extruded into a sheet shape, and then cooled to approximately 60° C. using a cooling roll to obtain an unstretched sheet. The unstretched sheet was then heated again to the machine-direction stretching temperature shown in Table 2, stretched five times in the machine direction utilizing the difference in circumferential speed of a group of rolls.

After this stretched sheet was heated again under the transverse-direction stretching conditions shown in Table 2 using a tenter oven and stretched eight times in the transverse direction using a tenter, annealing treatment was further performed on the sheet with a heat set zone adjusted to 160° C., and the sheet was then cooled to approximately 60° C. with a cooling roll. The edges of the sheet were slit to obtain a laminated biaxially stretched sheet having a two-layer structure of base layer/intermediate layer.

A heat seal layer resin in which 76 mass % of PE3, 18 mass % of CA2, and 6 mass % of CA5 shown in Table 1 were mixed was melt-kneaded using an extruder set at 240° C., then extruded into a sheet shape from a T-die set at 230° C. The obtained sheet was laminated onto the surface of the intermediate layer side of the laminated biaxially stretched sheet and cooled with a cooling roll to obtain a laminate sheet having a three-layer structure of base layer/intermediate layer/heat seal layer.

The laminate sheet was then guided into a corona discharge treatment device by guide rollers, and corona discharge treatment was performed in a treatment dose of 50 W·min/m² on the surface on the base layer side, and taken up by a winder. This was used as a thermoplastic resin film.

The thickness, density, smoothness, and parameters of surface roughness of the thermoplastic resin films are as shown in Table 2.

Examples 16 to 18 and Comparative Examples 5 to 8

A raw material for a base layer formed from PP1 shown in Table 1 was melt-kneaded in an extruder set at 210° C., supplied to a T-die set at 250° C., extruded into a sheet shape from the T-die, and then cooled to approximately 60° C. using a cooling roll to obtain an unstretched sheet. The unstretched sheet was then heated again to 140° C., stretched four times in the machine direction utilizing the difference in circumferential speed of a group of rolls.

After this stretched sheet was heated again to 155° C. using a tenter oven and stretched nine times in the transverse direction using a tenter, annealing treatment was further performed on the sheet with a heat set zone adjusted to 160° C., and the sheet was then cooled to approximately 60° C. with a cooling roll. The edges of the sheet were slit to obtain a transparent biaxially stretched sheet of the base layer.

A heat seal layer resin in which PE3, PP3 or PP4 as a resin incompatible with the PE3, and CA2 or CA5 as an inorganic fine powder shown in Table 1 were mixed in the proportions shown in Table 2 was melt-kneaded using an extruder set at 230° C., then extruded into a sheet shape from a T-die set at 230° C. The obtained sheet was laminated onto one surface of the transparent biaxially stretched sheet, and cooled with a cooling roll to obtain a laminate sheet having a two-layer structure of base layer/heat seal layer. The laminate sheet was then guided into a corona discharge treatment device by guide rollers, and corona discharge treatment was performed in a treatment dose of 50 W·min/m² on the surface on the base layer side, and taken up by a winder. This was used as a thermoplastic resin film.

The thicknesses, densities, smoothnesses, and parameters of surface roughness of these thermoplastic resin films are as shown in Table 2.

Evaluation results of printed surfaces of the labels which are obtained by subjecting the thermoplastic resin films obtained in examples and comparative examples to flexographic printing and punching out the printed thermoplastic resin film, and evaluation results of appearance of label parts of the plastic containers with labels obtained by using the labels are shown in Table 3.

TABLE 3

| | Evaluation of label | Evaluation of container with label | |
|---|---|---|---|
| | Evaluation of surface of flexographic printed material | Adhesive strength (N/15 mm) | Evaluation of appearance of label part |
| Example 1 | Excellent | 7.26 | Excellent |
| Example 2 | Excellent | 7.36 | Excellent |
| Example 3 | Excellent | 4.22 | Marginal |
| Example 4 | Excellent | 3.92 | Marginal |
| Example 5 | Excellent | 6.57 | Good |

TABLE 3-continued

| | Evaluation of label | Evaluation of container with label | |
|---|---|---|---|
| | Evaluation of surface of flexographic printed material | Adhesive strength (N/15 mm) | Evaluation of appearance of label part |
| Example 6 | Excellent | 6.37 | Good |
| Example 7 | Excellent | 6.08 | Good |
| Example 8 | Excellent | 4.12 | Marginal |
| Example 9 | Excellent | 4.43 | Marginal |
| Example 10 | Good | 3.43 | Marginal |
| Example 11 | Excellent | 5.65 | Good |
| Example 12 | Good | 7.85 | Good |
| Example 13 | Marginal | 8.53 | Marginal |
| Example 14 | Good | 6.55 | Good |
| Example 15 | Excellent | 2.03 | Good |
| Example 16 | Good | 3.46 | Good |
| Example 17 | Good | 3.82 | Good |
| Example 18 | Good | 3.53 | Good |
| Comparative Example 1 | Poor | 3.73 | Good |
| Comparative Example 2 | Good | 0.49 | Poor |
| Comparative Example 3 | Good | 2.65 | Poor |
| Comparative Example 4 | Good | 0.49 | Poor |
| Comparative Example 5 | Marginal | 2.78 | Poor |
| Comparative Example 6 | Good | 2.32 | Poor |
| Comparative Example 7 | Marginal | 2.12 | Poor |
| Comparative Example 8 | Good | 2.84 | Poor |

According to Tables 2 and 3, thermoplastic resin films of Examples 1 to 18 had a Rk of 1.2 to 9.0 μm and a Rzjis/Rk of 2.0 to 9.0 of the heat seal layer surface. Unprinted white parts were not observed in the surface evaluations of the in-mold molding labels obtained by subjecting the thermoplastic resin films to flexographic printing, and failures in appearance due to blisters and position shifts did not occur in the appearance evaluations of the label parts of the plastic containers with the labels obtained by adhering the in-mold molding labels.

Comparative Example 1 in which the Rk of the heat seal layer surface exceeded 9.0 μm, the adhesive strength tended to decrease compared to Example 12 in which the Rk was 7.1 μm and Example 13 in which the Rk was 8.5 μm. It is conceived that this is because the contact area between the heat seal surface of the label and the resin before the molding was reduced. On the other hand, with Comparative Examples 2, 3, and 5 to 8 in which the Rk of the heat seal layer surface was less than 1.2 μm, blisters occurred in the appearance evaluations of the label parts of the plastic containers with the labels. It is conceived that this is because cavity for discharging air was shallow, and dischargeability of air was poor.

Furthermore, with Comparative Example 4 in which the Rk was in the appropriate range but the Rzjis/Rk exceeded 9.0, blisters occurred in the appearance evaluation of the label part of the plastic container with the label. It is conceived that this is because a large number of narrow cavities existed, and dischargeability of air was poor. On the other hand, in Comparative Example 1 in which the Rk exceeded 9.0 and the Rzjis/Rk was less than 2.0, unprinted white part was observed in the surface evaluation of the in-mold molding label obtained by the flexographic printing. It is conceived that this is because the contact area of the adjacent thermoplastic resin films became smaller while the cavity was widened, and thus the projection portions of the heat seal layer were more easily transferred.

In the production of the thermoplastic resin film having at least a base layer containing a thermoplastic resin and a heat seal layer containing a thermoplastic resin, there are some methods to produce a surface having an Rk of the heat seal layer surface of 1.2 to 9.0 μm and an Rzjis/Rk of 2.0 to 9.0.

Examples 1 to 8 are intended to form recesses on the back surface by forming a large number of large microvoids in the intermediate layer and allowing the thermoplastic resin contained in the heat seal layer to be melted into the microvoids (thermoplastic resin films of Type A). It is indicated that, as the method of producing the thermoplastic resin film of Type A, there are a method in which the inorganic fine powder content in the intermediate layer is increased compared to the inorganic fine powder content in the base layer (Example 7), a method in which the melting point of the thermoplastic resin contained in the intermediate layer is made lower than the melting point of the thermoplastic resin contained in the base layer (Example 8), and a method in which these two methods are combined (Examples 1 to 6).

Furthermore, Examples 12 to 14 are methods in which an emboss pattern is formed using an embossing roll when the stretched film is laminated on the heat seal layer (thermoplastic resin films of Type B). It is indicated that the method of producing the thermoplastic resin film of Type B can be applied to both an opaque base material (Examples 12 and 13) and a transparent base material (Example 14).

Furthermore, Examples 15 to 18 are methods in which the resin composition constituting the heat sealing has a special composition and recesses and protrusions are spontaneously formed on the heat seal layer surface during the production process (thermoplastic resin films of Type C).

The method of producing the thermoplastic resin film of Type C include a method in which an inorganic fine powder is blended in the heat seal layer (Example 15). Comparison between Comparative Examples 5 and 6 suggests that it is preferred to make the compounded amount of the inorganic fine powder appropriate and to use a combination of the particles having an aspect ratio of 1 to 1.5 and the particles having an aspect ratio of greater than 1.5 but 10 or less. Furthermore, it is also suggested that, even when a part or all of the inorganic fine powder is replaced with an organic filler, the organic filler can be treated as particles having an aspect ratio of 1 to 1.5. When the Rk is close to the lower limit value, the Rzjis/Rk tends to be closer to the upper limit value.

Furthermore, as the method of producing the thermoplastic resin film of Type C, there is a method in which the thermoplastic resin contained in the heat seal layer is a combination of resins of two or more components that are incompatible each other (Examples 16 and 17). Furthermore, combined use with a method in which the inorganic fine powder is blended to the heat seal layer (Example 18) is also possible, and as is clear from the comparison between Example 18 and Comparative Examples 5 and 6, adjustment of the Rk and the Rzjis/Rk is made easier by the combined use of blending of incompatible resins and an inorganic fine powder.

Other examples indicate that the characteristics of the thermoplastic resin films of Types A to C described above can be combined.

Examples 9 and 10 are methods in which characteristics of the thermoplastic resin film of Type A in which a relatively large amount of the inorganic filler is blended to the intermediate layer and characteristics of the thermoplastic resin film of Type C in which the inorganic fine powder is added to the heat seal layer are combined.

Furthermore, Example 11 is a method in which the characteristics of the thermoplastic resin film of Type A in which a relatively large amount of the inorganic filler is blended to the intermediate layer and characteristics of the thermoplastic resin film of Type B in which emboss pattern is formed using an embossing roll during the lamination of the heat seal layer onto the stretched film are combined, and indicates that the Rk and the Rzjis/Rk are easily adjusted to preferable ranges when the embossing method and stretching are combined.

INDUSTRIAL APPLICABILITY

According to the present invention, yield can be enhanced by suppressing feeding/ejecting troubles during printing due to enhancement in handleability of the label, printing quality troubles of the front surface due to the transfer of an embossing pattern of the back surface, and occurrence of blisters of the plastic container with the label, thereby making the productivity efficient. The present invention is highly effective in the production process of a large volume plastic container with an in-mold molding label and in the production process of a blow-molded container. Furthermore, since the front surface of the in-mold molding label of the present invention has excellent printing applicability, printing with high eye-catching effect can be performed. The obtained plastic container with the label is suitable to store, transport, and display for sales of various liquids (e.g. edible oils, liquid seasonings, beverages, alcohols, detergents for kitchen, detergents for clothes, shampoos, hair dressing agents, liquid soaps, rubbing alcohols, oils for automobiles, detergents for automobiles, agricultural chemicals, insecticides, and herbicides).

The invention claimed is:

1. A thermoplastic resin film comprising at least a base layer containing a thermoplastic resin and a heat seal layer containing a thermoplastic resin;
    the heat seal layer containing the thermoplastic resin having a melting point that is lower than a melting point of the thermoplastic resin of the base layer;
    a core roughness depth Rk of a surface of the heat seal layer measured in accordance with ISO 13565-2:1996 being from 1.2 to 9.0 µm; and
    a ratio Rzjis/Rk of a ten point height of roughness profile of the surface of the heat seal layer Rzjis to a core roughness depth Rk of the surface of the heat seal layer measured in accordance with JIS B0601:2013 Appendix 1 being from 2.0 to 9.0.

2. The thermoplastic resin film according to claim 1, wherein a core material portion Mr1 of the surface of the heat seal layer measured in accordance with ISO 13565-2:1996 is from 3.7 to 15.0%.

3. The thermoplastic resin film according to claim 1, wherein an Oken smoothness of the surface of the heat seal layer measured in accordance with JIS P 8155:2010 is from 1000 to 10000 seconds.

4. The thermoplastic resin film according to claim 1, further comprising an intermediate layer in between the base layer and the heat seal layer;
    the intermediate layer containing from 40 to 85 mass % of a thermoplastic resin and from 15 to 60 mass % of an inorganic fine powder; and
    a melting point of the thermoplastic resin contained in the intermediate layer being equal to or lower than the melting point of the thermoplastic resin contained in the base layer.

5. The thermoplastic resin film according to claim 1, wherein the heat seal layer contains from 15 to 50 mass % of a fine filler.

6. The thermoplastic resin film according to claim 5, wherein the heat seal layer contains a fine filler having an aspect ratio of 1 to 1.5 and an inorganic fine powder having an aspect ratio of greater than 1.5 but 10 or less.

7. The thermoplastic resin film according to claim 1,
    wherein the heat seal layer contains two or more types of the thermoplastic resins of the heat seal layer;
    among contents (mass %) of these thermoplastic resins relative to the total mass of the thermoplastic resins,
        a component (A) having the largest content and a component (B) having the second largest content following the component (A) are incompatible each other, and
        a ratio of the content of the component (A) to the content of the component (B) (content of component (A)/content of component (B)) is from 80/20 to 55/45.

8. The thermoplastic resin film according to claim 7, wherein a melting point of the component (B) is higher than a melting point of the component (A), and a difference between the melting point of the component (B) and the melting point of the component (A) is from 20 to 110° C.

9. A method of producing the thermoplastic resin film described in claim 4, the method comprising:
    forming a resin composition for the base layer containing the thermoplastic resin and the inorganic fine powder into a film;
    forming a first resin layer for the intermediate layer containing the thermoplastic resin and the inorganic fine powder on the film;
    forming a second resin layer for the heat seal layer containing the thermoplastic resin on the first resin layer to produce a laminate of the film, the first resin layer, and the second resin layer; and
    stretching the laminate containing the film, the first resin layer, and the second resin layer at least in a uniaxial direction;
    a thermoplastic resin having a melting point equal to or lower than a melting point of the thermoplastic resin contained in the resin composition for the base layer being used as the thermoplastic resin contained in the first resin layer; and
    a thermoplastic resin having a melting point lower than the melting point of the thermoplastic resin contained in the resin composition for the base layer being used as the thermoplastic resin contained in the second resin layer.

10. The method of producing the thermoplastic resin film according to claim 9,
    wherein a thermoplastic resin having a higher melting point than the melting point of the thermoplastic resin contained in the second resin layer is used as the thermoplastic resin contained in the first resin layer, and
    the laminate is stretched at a temperature higher than the melting point of the thermoplastic resin contained in the second resin layer and lower than the melting point of the thermoplastic resin contained in the first resin layer in the laminate stretching.

11. A method of producing the thermoplastic resin film described in claim 1, the method comprising:
  forming a resin composition for a base layer containing a thermoplastic resin and an inorganic fine powder into a film;
  obtaining a stretched film by stretching the film at least in a uniaxial direction;
  forming a resin layer for the heat seal layer containing the thermoplastic resin on the stretched film; and
  performing emboss processing onto a surface of the resin layer;
  the thermoplastic resin contained in the resin layer has a melting point lower than a melting point of the thermoplastic resin contained in the resin composition for the base layer.

12. A method of producing the thermoplastic resin film described in claim 8, the method comprising:
  forming a resin composition for a base layer containing a thermoplastic resin into a film;
  forming a resin layer for the heat seal layer containing the thermoplastic resin on the film layer to produce a laminate of the film and the resin layer; and
  stretching the laminate containing the film and the resin layer at least in a uniaxial direction;
  the thermoplastic resin contained in the resin layer containing the component (A) and the component (B) in which the melting point of the component (A) is lower than a melting point of the thermoplastic resin contained in the resin composition for the base layer; and
  the laminate being stretched at a temperature higher than a melting point of the component (A) and lower than a melting point of the component (B) in the laminate stretching.

13. An in-mold molding label comprising the thermoplastic resin film described in claim 1.

14. The in-mold molding label according to claim 13, wherein a surface on the other side against the heat seal layer of the thermoplastic resin film has printed information.

15. A plastic container with a label comprising
  the in-mold molding label described in claim 13 and
  a plastic container to which the in-mold molding label is adhered via the heat seal layer.

16. A method of producing a plastic container with a label, the method comprising
  adhering the in-mold molding label described in claim 13 to the plastic container via the heat seal layer at the same time as blow molding of the plastic container.

* * * * *